(12) United States Patent
Nakano et al.

(10) Patent No.: US 7,229,275 B2
(45) Date of Patent: Jun. 12, 2007

(54) DISK SUBSTRATE, MOLD APPARATUS FOR INJECTION MOLDING THE SAME, AND DISK SUBSTRATE TAKING-OUT ROBOT

(75) Inventors: Jun Nakano, Tokyo (JP); Jun Shimizu, Miyagi (JP); Ken Minemura, Saitama (JP)

(73) Assignee: Sony Corporation, Tokyo (JP)

( * ) Notice: Subject to any disclaimer, the term of this patent is extended or adjusted under 35 U.S.C. 154(b) by 58 days.

(21) Appl. No.: 10/706,934

(22) Filed: Nov. 14, 2003

(65) Prior Publication Data

US 2004/0096540 A1    May 20, 2004

Related U.S. Application Data

(62) Division of application No. 10/182,395, filed as application No. PCT/JP01/10793 on Dec. 10, 2001, now abandoned.

(30) Foreign Application Priority Data

| Dec. 15, 2000 | (JP) | .......................... 2000-386774 |
| Feb. 20, 2001 | (JP) | .......................... 2001-043522 |

(51) Int. Cl.
*B29D 11/00* (2006.01)
(52) U.S. Cl. .................. 425/553; 425/308; 425/810
(58) Field of Classification Search ................ 425/308, 425/315, 444, 553, 554, 556, 810
See application file for complete search history.

(56) References Cited

U.S. PATENT DOCUMENTS

| 5,340,303 A | 8/1994 | Maus et al. |
| 5,427,520 A * | 6/1995 | Shimizu et al. ............. 425/556 |
| 5,552,098 A * | 9/1996 | Kudo et al. ................. 264/106 |
| 2001/0026817 A1 * | 10/2001 | Shida et al. ................ 425/542 |

FOREIGN PATENT DOCUMENTS

| JP | 63-147619 | 6/1988 |
| JP | 63-206925 | 8/1988 |
| JP | 3-76615 | 4/1991 |
| JP | 3-79322 | 4/1991 |
| JP | 4-195743 | * 7/1992 |
| JP | 5-96581 | 4/1993 |
| JP | 5-278043 | 10/1993 |

(Continued)

OTHER PUBLICATIONS

English abstract for JP 4-195743.*
Computer translation of JP 6-198685.*
Computer translation of JP 7-68605.*
Patent Abstracts of Japan, JP 06-198685, Jul. 19, 1994.
Patent Abstracts of Japan, JP 07-068605, Mar. 14, 1995.

*Primary Examiner*—Donald Heckenberg
(74) *Attorney, Agent, or Firm*—Oblon, Spivak, McClelland, Maier & Neustadt, P.C.

(57) ABSTRACT

It is possible to obtain a disk substrate in which an edge of a center hole is free of flash. The disk substrate (23) in which the center hole (24) is provided with a straight portion (24a) and a tapered portion (24b), and an edge on the side of a signal transfer surface (22) of the tapered portion (24b) is provided with an R surface or C surface (24c), a mold apparatus optimum for molding the disk substrate (23), and a disk taking-out apparatus.

4 Claims, 27 Drawing Sheets

FOREIGN PATENT DOCUMENTS

| | | | |
|---|---|---|---|
| JP | 6-198685 | * | 7/1994 |
| JP | 7-68604 | | 3/1995 |
| JP | 7-68605 | * | 7/1995 |
| JP | 11-192642 | | 7/1999 |
| JP | 2000-317995 | | 11/2000 |
| TW | 442373 | | 6/2001 |

* cited by examiner

| | Example 1 | Comparative Example 1 | Comparative Example 2 | Comparative Example 3 |
|---|---|---|---|---|
| | Substrate of the present invention | Movable-side stamper substrate | Fixed-side stamper substrate | Comparative Example 2 removed by reamer |
| Ten measurements of eccentricity amount. | 20~30 μm | 20~30 μm | 15~70 μm | 20~30 μm |

Fig.13

DISK SUBSTRATE, MOLD APPARATUS FOR INJECTION MOLDING THE SAME, AND DISK SUBSTRATE TAKING-OUT ROBOT

CROSS REFERENCE TO RELATED APPLICATIONS

This application a division of application Ser. No. 10/182,395, filed Nov. 13, 2002 now abandoned, which is a National Stage of JP01/10793, filed Dec. 10, 2001, the entire contents of which is incorporated by reference herein.

TECHNICAL FIELD

The present invention pertains to the technical field of a disk substrate to which audio, video and other various kinds of information, a tracking servo signal and the like are transferred at the time of injection molding, a mold apparatus for injection molding the disk substrate, and a disk substrate taking-out apparatus for taking out the disk substrate from the mold apparatus.

BACKGROUND ART

Hitherto, an optical recording medium and a magnetic recording medium have been widely known as a circular disk form recording medium such as CD, CD-ROM, DVD, DVR, MD and the like on which audio, video and other various kinds of information, a servo signal and the like are recorded. These recording media include a phase change type optical disk such that a laser beam is radiated onto a synthetic resin disk substrate on which such signals as information signals and a tracking servo signal are written in the form of pits and a groove (guide groove) and the signals are read by utilizing a change in reflectance due to a change of crystal structure of a recording layer, an opto-magnetic disk for reading signals by utilizing a magneto-optical effect, a magnetic disk for writing and reading signals magnetically, and so on.

As a method for forming information signals, a tracking servo signal and the like in the form of fine roughness such as pits, a groove and the like in the recording layer of the disk substrate, a method of injection molding the disk substrate by use of a mold apparatus is generally used today.

FIGS. 22 to 24 show a mold apparatus 51 of a projected form gate cutting system using a fixed side stamper according to the prior art, in which a cavity 54 as a circular disk form space is vertically formed between faying surfaces of a fixed die 52 and a movable die 53. A stamper 55 is vertically disposed on the fixed die 52 side of the cavity 54, and the innermost circumference of the stamper 55 is fixed to a fixed mirror surface by a mechanical clamp. A cylindrical sprue bushing 56 is horizontally disposed in the fixed die 51 at a central portion of the cavity 54, and a cylindrical projected form gate cutter (also called "punch"), a small diameter ejector pin 58 and a cylindrical ejector 59 are horizontally disposed at a position opposite to the sprue bushing 56. The ejector pin 58 is disposed at the center of the projected form gate cutter 57, and the ejector 59 is disposed at the outer circumference of the projected form gate cutter 57.

A sprue 60 at the center of the sprue bushing 56 to which an injection cylinder (not shown) is connected is opened at the center of a projected form gate forming recessed portion 61 formed at the tip of the sprue bushing 56, and the tip of the projected form gate cutter 57 is formed at a projected form gate forming projected portion 62. A projected form gate 64 formed in a projected shape relative to a signal transfer side surface 63 which is a surface on the stamper 55 side of the cavity 54 is formed between the recessed portion 61 and the projected portion 62. Therefore, the projected form gate cutter 57 is a projected form gate cutter for forming the projected form gate 64.

In the mold apparatus 51 of the projected form gate system according to the prior art, a molten resin P1 consisting of a plasticized polycarbonate or other synthetic resin is injected in the direction of arrow a from the injection cylinder into the sprue 60 and is charged under pressure into the cavity 54 through the projected form gate 64, in the condition where the fixed die 52 and the movable die 53 are heated. In this case, the molten resin P1 compressed to a high pressure by the injection cylinder is pressurized onto the fine roughness surface of the stamper 55, whereby a disk substrate 73 in which signals 71 such as information signals, a tracking servo signal and the like are transferred onto a signal transfer surface 72 in the form of pits, a groove and the like is injection molded, as shown in FIGS. 25 and 26. Thereafter, a center hole 74 of the disk substrate 73 is formed by punching.

In this case, the conditions of accuracy of transfer of the signals 71 onto the disk substrate 73 are determined primarily by the plasticized molten resin temperature, the mold temperature, and the injection pressure of the injection cylinder, whereas the warpage and the like of the disk substrate 73 thus injection molded are determined by the mold temperature, injection pressure and cooling time.

The formation of the center hole 74 of the disk substrate 73 injection molded is generally carried out during the process of cooling the fixed die 52 and the movable die 53 while continuing the compression of the molten resin P1 charged in the cavity 54.

Hitherto, the center hole 74 as a circular hole has been formed in the center of the disk substrate 73 by punching (called "gate cutting"), by a method in which the projected form gate cutter 57 is projected in the direction of arrow b from a retracted position shown in FIG. 23 to an advanced position shown in FIG. 24 so as to cut the incompletely solidified resin between an outer circumferential surface 62a of the projected portion 62 of the projected form gate cutter 57 and an inner circumferential surface 61a of the recessed portion 61 of the sprue bushing 56. At this time, a roughly T-shaped sprue and gate remaining resin 73a remaining in the sprue 60 and the projected form gate 64 is ejected in the direction of arrow b from the signal transfer surface 72 of the disk substrate 73 toward the fixed die 52 side.

As shown in FIG. 25, the center hole 74 of the optical disk or the like of 12 cm in diameter, such as CD, CD-ROM, DVD, DVR, etc., has a diameter $\phi=15.0$ mm, whereas the center hole 74 of an MD or the like has a diameter $\phi=11.0$ mm.

As shown in FIG. 25, the center hole 74 thus formed is formed as a straight hole of which the hole diameter is parallel to the axial direction over the entire thickness of the disk substrate 73.

Though the timing of the punching of the center hole 74 varies according to the kind of the synthetic resin or the like, the punching is preferably conducted by the projected form gate cutter 57 before the molten resin P1 is completely solidified, and is said to be preferably conducted within a period of about 2 sec after completion of the injection of the molten resin P1. When the timing of the punching of the center hole 74 is delayed from the above-mentioned, strain due to punching and punch tailings are liable to be generated at the inner circumference of the center hole 74, and a disk substrate 73 with abnormal birefringence may be molded or gate cutting stroke may be varied, resulting in a defective product.

However, when the center hole 74 is punched between the projected portion 62 of the projected form gate 57 and the recessed portion 61 of the sprue bushing 56 at the timing before solidification of the molten resin P1 which is within 2 sec after the injection molding of the molten resin P1, the resin P1 before solidification would fly into the clearance between the outer circumferential surface 62a of the projected portion 62 and the inner circumferential surface 61a of the recessed portion 61, so that a flash 75 in the shape of projecting to the outside from the edge on the signal transfer surface 72 side of the center hole 74 is necessarily generated, as shown in FIG. 25. The height H1 of the flash 75 varies according to the molding conditions (the temperature of the resin P2 in the gate, and the like) of the clearance between the recessed portion 61 and the projected portion 62 shown in FIGS. 22 and 23; hitherto, the height H1 has been several tens of μm to as large as 100 μm.

The disk substrate 73 shown in FIG. 26 is one that is obtained by injection molding by a mold apparatus using a movable-side stamper according to the prior art and punching the center hole 74 from the signal transfer surface 72 side to the opposite side. In this case, there is generated a flash 75 in the shape of projecting outwards from the surface opposite to the signal transfer surface 72 of the center hole 74, and the height H1 of the flash 75 is equivalent to that shown in FIG. 25.

FIG. 27 shows a conventional disk substrate taking-out robot 81 by which the disk substrate 73 injection molded by the mold apparatus 51 is taken out of the mold apparatus 51 and transferred onto an aligning machine (not shown).

Namely, where the disk substrate 73 is injection molded by the mold apparatus 51 of the projected form gate cutting system using a conventional fixed-side stamper described referring to FIG. 22, the punching of the center hole 74 (gate cutting) is conducted by the projected form gate cutter 57 which is projected in the direction of arrow b from the movable die 53 side toward the fixed die 52, as described referring to FIG. 24. In the case of taking out the injection molded disk substrate 73 from the mold apparatus 51, the movable die 53 is opened (spaced away) from he fixed die 52 in the direction of arrow a in FIG. 22, and the sprue and gate remaining resin 73a and the disk substrate 73 are stripped off from the movable die 53 in the direction of arrow b in FIG. 22 by the ejector pin 58, the ejector 59 and the like, when the disk substrate 73 and the sprue and gate remaining resin 73a are spaced away from each other so that the disk substrate 73 is left on the side of the direction of arrow a which is the side of the movable die 53 whereas the sprue and gate remaining resin 73a is left on the side of the direction of arrow b which is the side of the fixed die 52, as shown in FIG. 27.

The robot 81, first, in FIG. 22, chucks an outer circumferential portion of the center hole 74 of the disk substrate 73, which is stripped from the movable die 53 in the direction of arrow b by the ejector 59, by sucking by a vacuum pad 82 from the side of the signal transfer surface 72, and receives the disk substrate 73 in the manner of separating the disk substrate 73 away from the movable die 53 in the direction of arrow b. Simultaneously, the sprue and gate remaining resin 73a ejected in the direction of arrow b by the ejector pin 58 is gripped by the robot 81, and the disk substrate 73 and the sprue and gate remaining resin 73a are taken out from between the fixed die 52 and the movable die 53.

Next, the disk substrate 73 is transferred to the aligning machine by the robot 81, and is aligned by fitting the center hole 74 of the disk substrate 73 onto a disk-receiving arm (not shown) of the aligning machine from the side of a reference surface 76 (described later) which is the surface opposite to the signal transfer surface 72. After the disk substrate 73 is transferred to the aligning machine, the sprue and gate remaining resin 73a is discharged from the robot 81 by spontaneous falling or by blowing air.

The disk substrate 73 injection molded as mentioned above and shown in FIGS. 25 and 26 is then subjected to lamination (coating) of a plurality of layers in the order of a recording layer, a reflective layer and a protective layer on the signal transfer layer 72, to which signals 71 have been transferred, whereby an optical disk 77 such as a CD and a DVD is completed.

In an optical disk drive device on which the optical disk 77 or the like is used, a laser beam is incident from the reference surface 76 opposite to the signal transfer surface 72, wherein writing and reading of information are conducted. According to a specification, the reference surface 76 which is a laser beam incident surface becomes a reference surface of height, a positioning center pin of a spindle motor used for driving the disk is inserted into the center hole 74 from the side of the reference surface 76, and centering is conducted by an edge 74b on the side of the reference surface 76 opposite to the signal transfer surface 72 of the center hole 74. Therefore, though the disk substrate 73 with the flash 75 generated on the side of the signal transfer surface 72, as shown in FIG. 25, can be centered without bad effects of the flash 75, the disk substrate 73 with the flash 75 generated on the side of the reference surface 76 as shown in FIG. 26 cannot be centered with high accuracy.

In the optical disk drive device, a servo mechanism with high accuracy is used in order to write and read information by focusing and reflecting a laser beam on the signals 71 constituted of fine roughness. However, the servo performance of the servo mechanism has a limitation, and, particularly, it is important to restrain eccentricity of a spirally shaped groove and the center hole 74. In recent years, the allowable value of the eccentricity of the groove and the center hole 74 has been reduced attendant on an increase in the recording density, to 100 μm in the case of CD and to 60 μm in the case of DVD.

On the other hand, the increase in the recording density is realized mainly by a decrease in the wavelength of the laser beam and an enhancement of NA (enhancement of lens magnification) of a focusing lens (objective lens). In the case of the CD which is most popular, a laser with a wavelength of 780 nm and a focusing lens with an NA of 0.45 are used, and in the case of the DVD, a laser with a wavelength of 630 nm and a focusing lens with an NA of 0.6 are used. Attendant on the enhancement of NA of the focusing lens, the disk substrate 73 which is a laser beam transmission layer is gradually reduced in thickness in order to reduce the effect of aberration. A disk substrate 73 with a thickness of 1.2 mm is used in the case of CD, and a disk substrate with a thickness of 0.6 mm is used in the case of DVD, thereby contributing to coping with camber of the optical disk.

In recent years, in order to contrive a further increase in recording density, it has been proposed to use a laser with a wavelength of 400 nm and a focusing lens with an NA of 0.85. Where the focusing lens enhanced in NA is used, it is necessary to reduce the thickness of the disk substrate 73 to about 0.1 mm; in general injection molding, however, it is difficult to mold an ultrathin disk substrate 73 which satisfies the specifications of camber and birefringence.

In view of the above, these problems have been solved by laminating a reflective layer, a dielectric layer, a recording layer and a dielectric layer, in this order opposite to the conventional order, on the signal transfer surface 72 of the disk substrate 73 to which the signals 71 constituted of fine roughness have been transferred in the conventional manner, and, finally, forming a light transmission layer of 0.1 mm in thickness.

In this case, however, the reference surface is on the opposite side as compared with the conventional disk substrate 73, and, as shown in FIGS. 25 and 26, a tapered positioning center pin 79 of a disk table 78 in the spindle motor used for driving the disk is inserted in the center hole 74 from the signal transfer surface 72 side and chucked, and centering is conducted by an edge 74a on the signal transfer surface 72 side of the center hole 74.

In this case, the disk substrate 73 shown in FIG. 26 has no flash 75 generated at the edge 74a on the signal transfer surface 72 side of the center hole 74, so that it can be centered with high accuracy. On the other hand, the disk substrate 73 having a flash 75 generated at the edge 74a on the signal transfer surface 72 side of the center hole 74 as shown in FIG. 25 cannot be centered with high accuracy.

In addition, since this system has a very small allowable value of the eccentricity of the disk substrate 73, the flash 75 generated on the signal transfer surface 72 side of the center hole 74 as shown in FIG. 25 is fatal.

Although the flash 75 can be removed by a method of cutting by a reamer or the like, the generation of waste upon removal of the flash 75 and the increase in the number of working steps lead necessarily to deterioration of yield and an increase in cost.

In order to restrain the generation of the flash 75 on the signal transfer surface 72, the stamper 55 to be fitted to the mold may be disposed not on the side of the fixed die 52 but on the side of the movable die 53 (this method is called "movable-side stamper"). Although the generation of the flash 75 on the signal transfer surface 72 can surely be obviated by this method, the movable-side stamper has such a structure that the shapes of the pits and the groove to be transferred are liable to be asymmetric. The reason is as follows. In this method, at the time of molding, after completion of cooling, the movable die 53 is opened while keeping the disk substrate 73 sucked onto the movable die 53 side, and the disk substrate 73 is taken out in the manner of stripping the stamper 55 and the disk substrate 73 by the ejector 59 and air. However, after the movable die 53 is opened, the disk substrate 73 is rapidly cooled and shrinks. Since the stamper 55 shrinks less as compared with the disk substrate 73, however, the pits and the groove are deformed. The accuracy required of the shape of the fine roughness increases as the recording density of the disk increases, and, therefore, it is difficult to mold the disk substrate 73 even by the movable-side stamper.

Even if a disk substrate to which fine roughness free of deformation has been transferred can be molded by using the movable-side stamper under a material and molding conditions substantially free of shrinkage, the generation of the flash 75 on the side of the surface 76 opposite to the signal transfer surface 72 cannot be avoided. Though the flash 75 does not have bad effects on the disk eccentricity at the time of chucking, waste might be generated through stripping of the flash 75 at the time of production, and the flash might adhere to the disk substrate 73 to thereby cause an increase in error, leading to a reduction in yield.

The present invention has been made to solve the above-mentioned problems. Accordingly, it is an object of the present invention to provide a disk substrate free of flash at the edge of a center hole, a mold apparatus optimum for injection molding the disk substrate, and a disk ejection apparatus optimum for taking out the disk substrate from the mold apparatus.

DISCLOSURE OF INVENTION

A disk substrate according to the present invention for attaining the above object is a disk substrate with signals transferred thereto by injection molding, which includes a center hole, and an edge with flash reduced to zero or suppressed to equal to or less than 10 μm, provided at least on the signal transfer surface side of the center hole.

The disk substrate includes a first R surface or a first C surface at least at the edge of the center hole.

The disk substrate further includes a straight portion with a hole diameter equal in direction with the axial direction, provided on the side opposite to the signal transfer surface side of the center hole, and a tapered portion with a hole diameter gradually enlarged toward the signal transfer surface, provided between the straight portion of the center hole and the signal transfer surface.

A mold apparatus for injection molding a disk substrate according to the present invention for attaining the above object is a mold apparatus for injection molding a disk substrate including a cavity into which a molten resin is injected through a sprue and a gate, and a signal transfer stamper disposed on a fixed die side of the cavity, wherein the mold apparatus includes a gate forming projected portion provided at the tip of the sprue bushing, a gate forming recessed portion provided oppositely to the projected portion at the tip of a gate cutter disposed on the side of a movable die, and a center hole molding portion provided at the outer circumference of the sprue.

The center hole molding portion includes a first R surface molding portion or a first C surface molding portion for molding the first R surface or the first C surface at the edge on the signal transfer surface side of the center hole of the disk substrate injection molded in the cavity.

The center hole molding portion further includes a straight molding portion for molding a straight portion with a hole diameter equal in direction with the axial direction, on the side opposite to the signal transfer surface side of the center hole of the disk substrate injection molded in the cavity, and a taper molding portion, provided in connection with the straight molding portion, for molding a tapered portion with a hole diameter gradually enlarged toward the signal transfer surface side, between the straight portion of the center hole and the signal transfer surface of the disk substrate injection molded in the cavity.

The advance amount of the gate cutter is not less than the thickness of the gate and is not more than the gate thickness plus 0.5 mm.

The position of cutting the gate by the gate cutter is set at a position equal to the hole diameter of the straight portion of the center hole.

The gate cutter includes, at the tip of an outer circumferential portion of the recessed portion, a second R surface molding portion or a second C surface molding portion for molding a second R surface or a second C surface at the edge on the side opposite to the signal transfer surface side of the center hole.

The position of cutting the gate by the gate cutter is set at a first position equal to the hole diameter of the straight portion of the center hole and at a second position located on the inside of the first position and smaller in diameter than the first position.

A disk substrate taking-out apparatus according to the present invention for attaining the above object includes: a mold apparatus including a cavity formed between a fixed die and a movable die, a signal transfer stamper disposed on the fixed die side of the cavity, and a gate cutter disposed on the movable die side, wherein a molten resin is injected into the cavity through a sprue and a gate to injection molding a disk substrate, and gate cutting is conducted from the movable die side by the gate cutter; and a robot for detaching from the movable die the disk substrate stripped from the fixed die together with the movable die by the opening of the movable die after injection molding, the robot including a means for discharging a sprue and gate remaining resin to the movable die side relative to the disk substrate at the time of holding the disk substrate.

The discharging means is provided with an air jet nozzle.

The disk substrate according to the present invention, constituted as described above, has an edge completely free of flash at least on the signal transfer surface side of the center hole, or even if the flash is generated, the flash can be suppressed to equal to or less than 10 µm in height, so that the centering of the disk substrate by a positioning center pin of a spindle motor can be performed with high accuracy.

In addition, since the first R surface or the first C surface is formed at least at the edge of the center hole, the edge is completely free of flash.

Besides, the center hole includes the straight portion with a hole diameter equal in direction with the axial direction, provided on the side opposite to the signal transfer surface side of the center hole, and the tapered portion with a hole diameter gradually enlarged toward the signal transfer surface side, provided between the straight portion of the center hole and the signal transfer surface. Therefore, at the time of opening the mold after completion of cooling of the resin in the cavity and stripping the disk substrate from the stamper disposed on the fixed die side, the mold can be easily released.

The injection molding apparatus according to the present invention, constituted as described above, is the mold apparatus for molding a disk substrate, including the cavity into which a molten resin is injected through the sprue and the gate, and the signal transfer stamper disposed on the fixed die side of the cavity, and having a gate cutting structure including the gate forming projected portion provided at the tip of the sprue bushing, the gate forming recessed portion provided oppositely to the projected portion at the tip of the gate cutter disposed on the movable die side, and the center hole molding portion provided at the outer circumference of the sprue bushing. Therefore, at the time of injection molding of the disk substrate, the center hole is simultaneously injection molded by the center hole molding portion. Thus, even when gate cutting is conducted by advancing the gate cutter with a tip from the movable die side, it is possible to produce a center hole with both edges free of flash.

In addition, the center hole molding portion is provided with the first R surface molding portion or the first C surface molding portion for molding the first R surface or the first C surface at the edge on the signal transfer surface side of the center hole. Therefore, at the time of injection molding the disk substrate, the edge on the signal transfer surface side of the center hole can be simultaneously injection molded to be an R surface or a C surface.

Besides, the center hole molding portion is provided with the straight molding portion for molding the straight portion with a hole diameter equal in direction with the axial direction on the side opposite to the signal transfer surface of the center hole, and the center hole molding portion is provided with the taper molding portion for molding the tapered portion with a hole diameter gradually enlarged from the straight portion of the center hole toward the signal transfer surface side. Therefore, at the time of injection molding the disk substrate, the center hole can be simultaneously injection molded with the straight portion and the tapered portion.

In addition, the advance amount of the gate cutter can be set to be equal to or more than the thickness of the gate and equal to or less than the gate thickness plus 0.5 mm. Therefore, the gate cutting can be securely performed.

Besides, the position of cutting the gate by the gate cutter is set at a position equal to the hole diameter of the straight portion of the center hole of the disk substrate. Therefore, at the time of cutting the gate, flash or the like is not generated in the straight portion of the center hole of the disk substrate.

In addition, the gate cutter is provided with the second R surface molding portion or the second C surface molding portion for molding the second R surface or the second C surface at the edge on the opposite side of the signal transfer surface of the center hole, at the tip of the outer circumferential portion of the gate forming recessed portion. Therefore, the second R surface or the second C surface can be molded at the edge on the opposite side of the signal transfer surface of the center hole of the disk substrate.

Besides, the position of cutting the gate by the gate cutter is set at the first position equal to the hole diameter of the straight portion of the center hole of the disk substrate and at the second position located on the inside of the first position and smaller in diameter than the first position. Therefore, the outermost diameter of the sprue and gate remaining resin cut by the gate cutter can be made smaller than the inside diameter of the sprue bushing.

In addition, the disk substrate taking-out apparatus according to the present invention, constituted as described above, is so constructed that gate cutting is conducted by the gate cutter from the movable die side, and the robot for taking out from the movable die the disk substrate stripped from the fixed die together with the movable die by the opening of the movable die after injection molding is provided with the means for discharging the sprue and gate remaining resin to the movable die side relative to the disk substrate. Therefore, it is possible to provide a disk substrate taking-out apparatus optimum for application to the mold apparatus of the gate cutting structure.

Besides, when the means for discharging the sprue and gate remaining resin is provided with the air jet nozzle, the discharge of the sprue and gate remaining resin to the movable die side can be performed securely and instantaneously.

BRIEF DESCRIPTION OF DRAWINGS

FIG. 13 shows the results of comparison of eccentricity amounts of a disk substrate according to the present invention, a movable-side stamper substrate, a fixed-side stamper substrate, and a disk substrate removed by a reamer.

BEST MODE FOR CARRYING OUT THE INVENTION

Now, a disk substrate, a mold apparatus for injection molding the same, and a disk substrate taking-out robot according to the present invention will be described below referring to FIGS. 1 to 21, in the following order.

Figure 1:
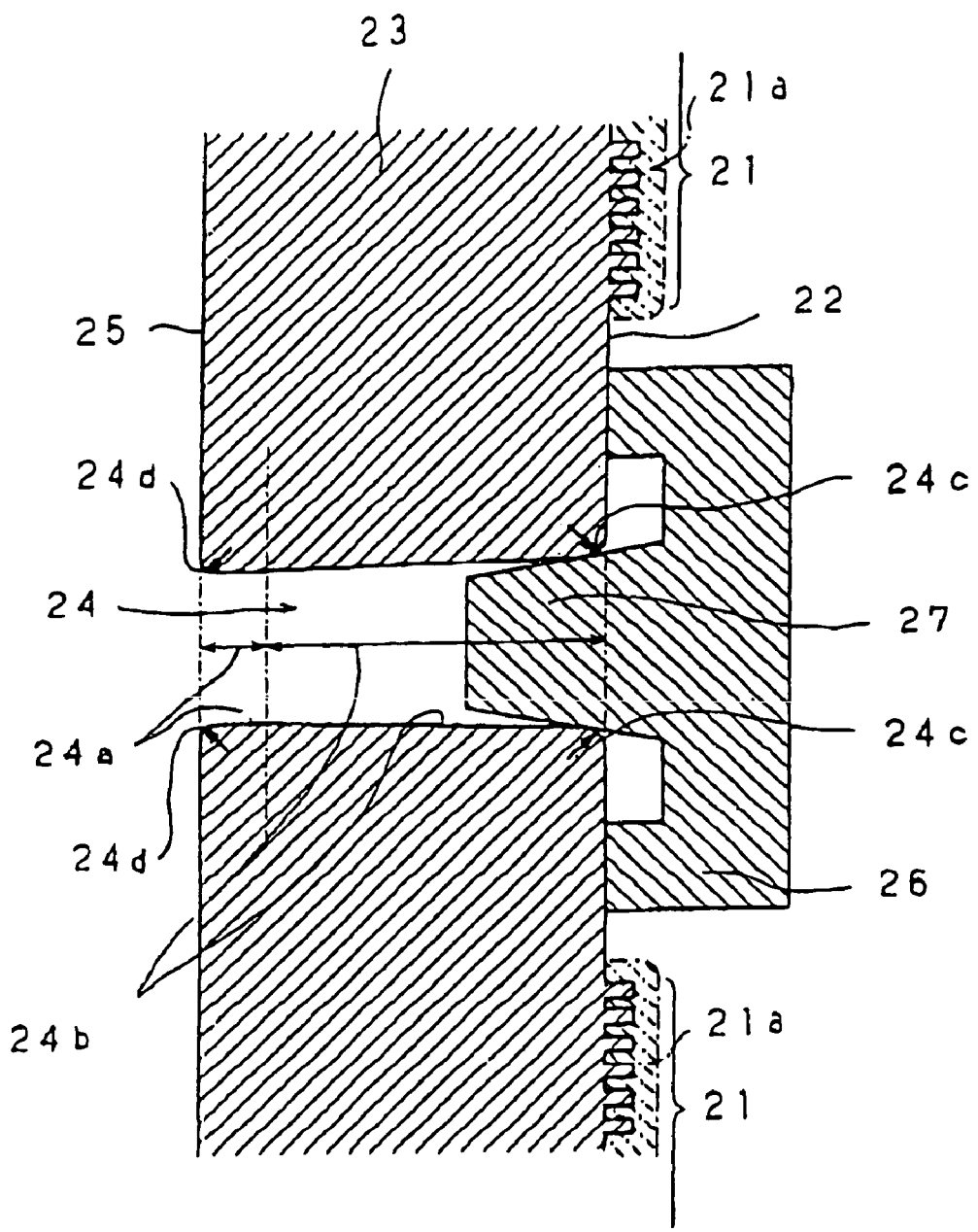
FIG. 1 is a sectional view illustrating a center hole portion of a disk substrate in an embodiment of the present invention.
Figure 2:
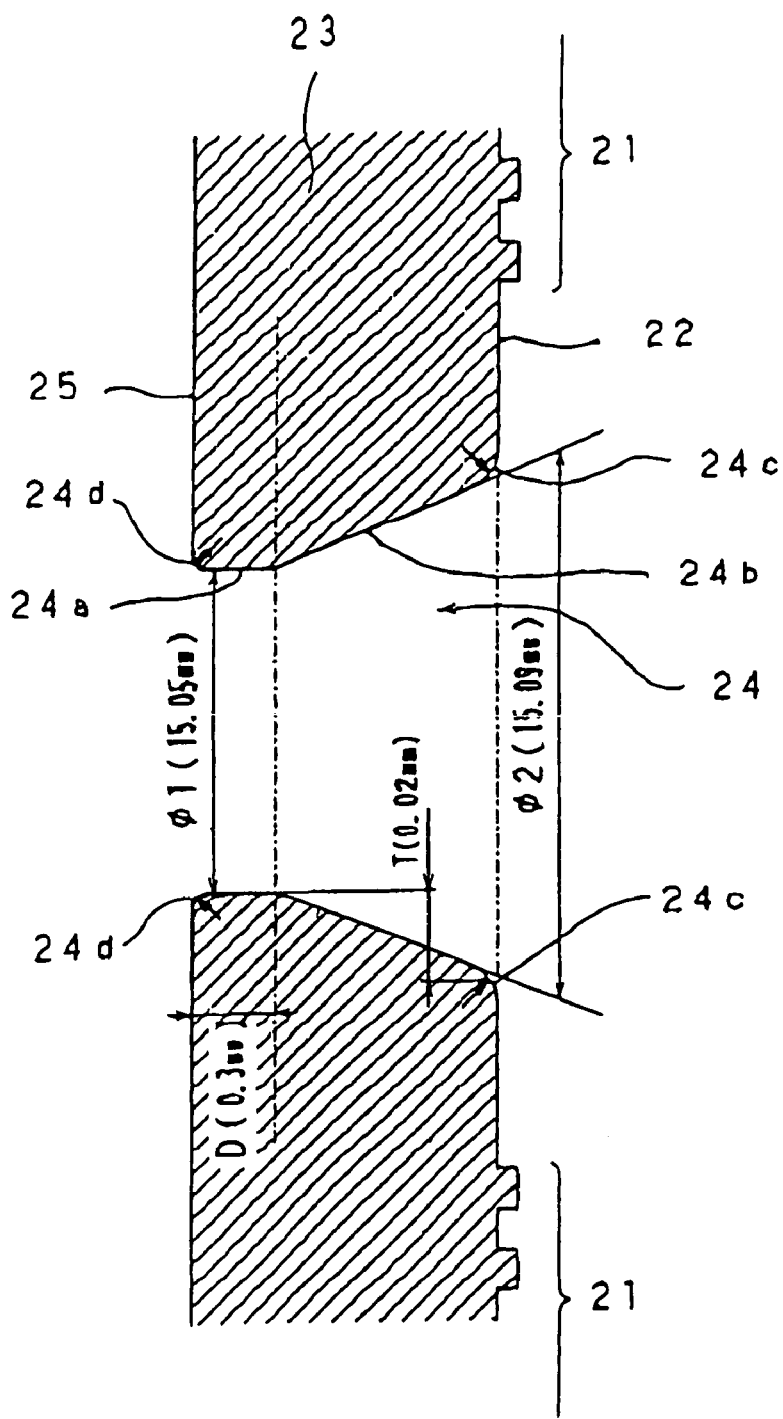
FIG. 2 is an enlarged sectional view of the center hole of FIG. 1.

(1) Description of the disk substrate (FIGS. 1 and 2)

(2) Description of First Embodiment of the mold apparatus for injection molding the disk substrate (FIGS. 3 to 10)

Figure 11:
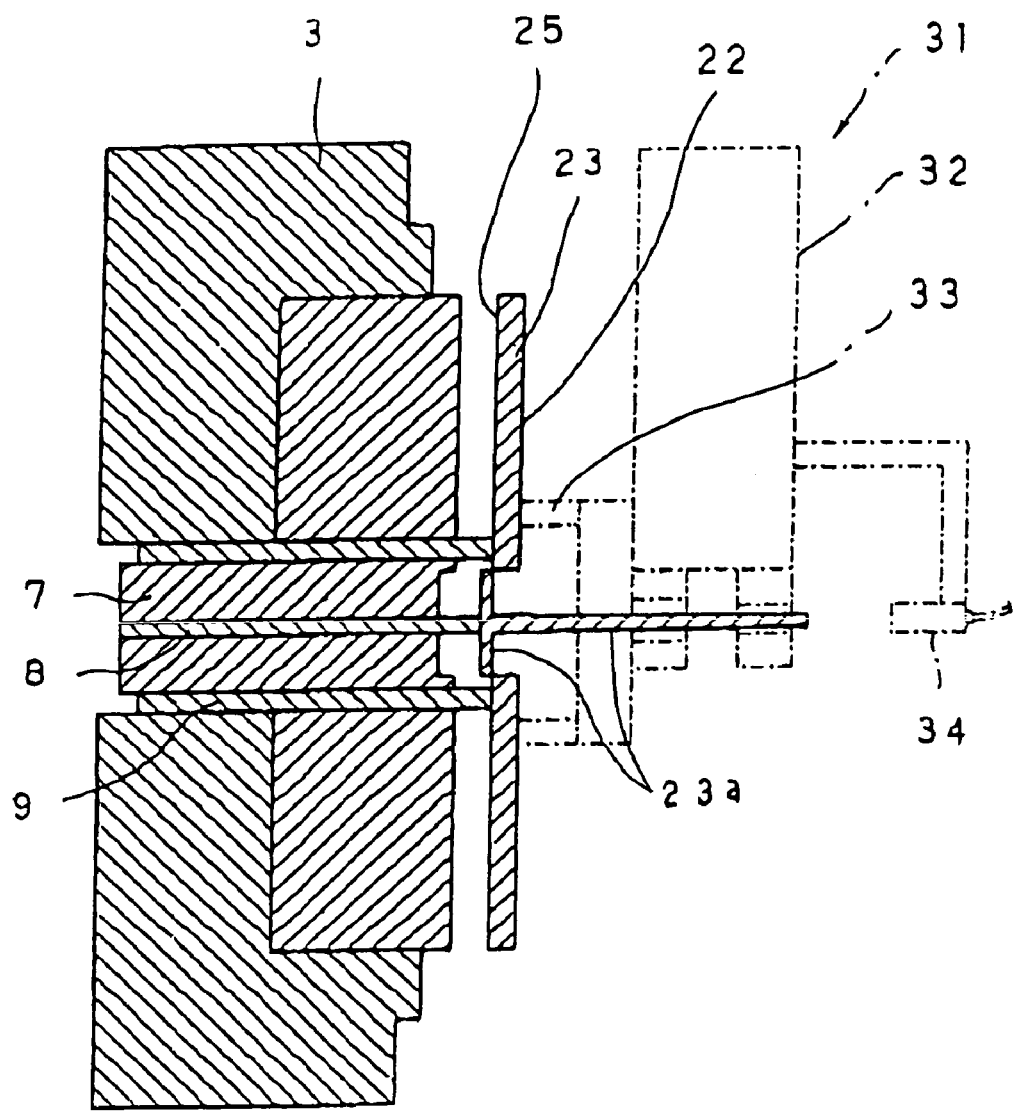
FIG. 11 is a sectional view showing the condition where the disk substrate of FIG. 10 is chucked by a robot of a disk ejection apparatus.
Figure 12:
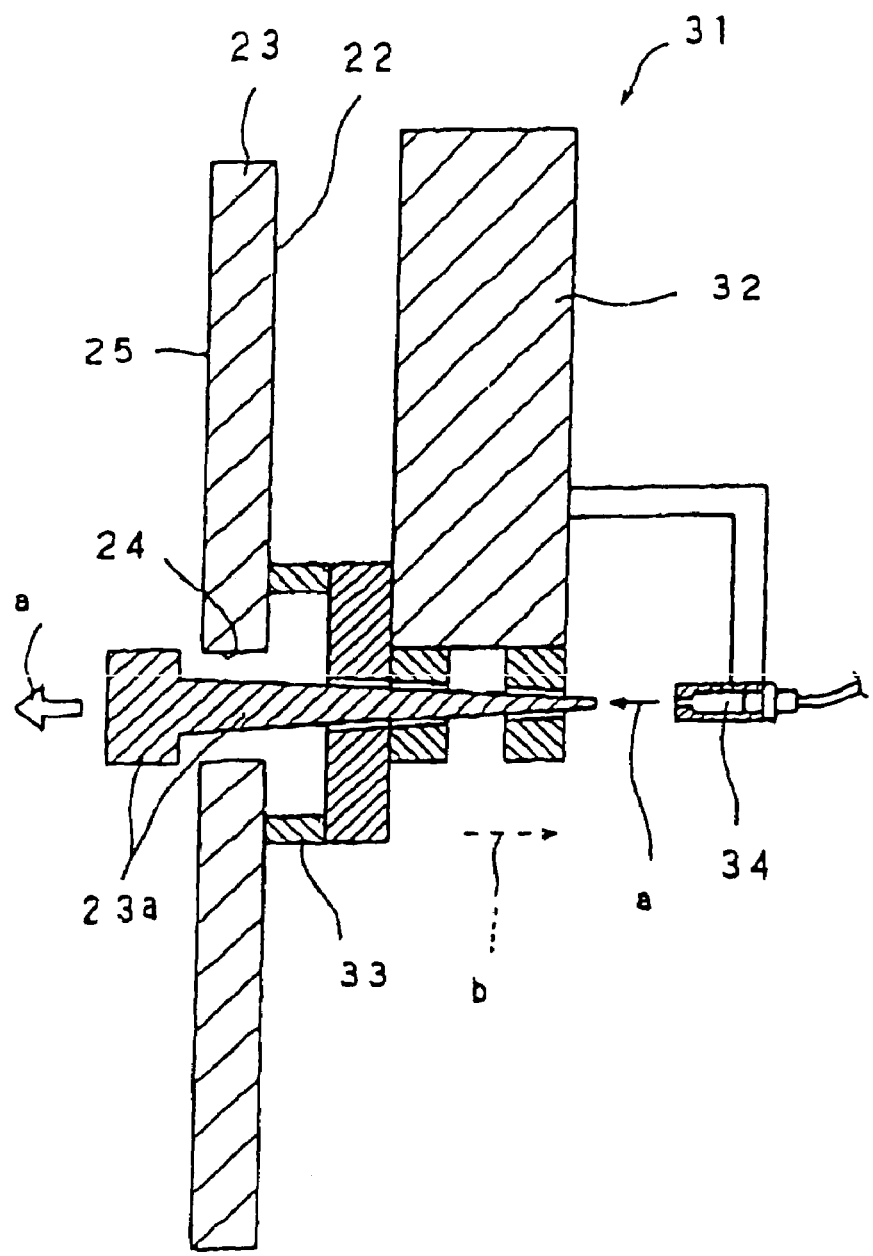
FIG. 12 is a sectional view illustrating an operation of discharging a sprue and gate remaining resin by the robot of FIG. 11.

(3) Description of the disk substrate taking-out apparatus (FIGS. 11 and 11)

(4) Description of measurement results of eccentricity amount of the disk substrate (FIG. 13)

Figure 14:
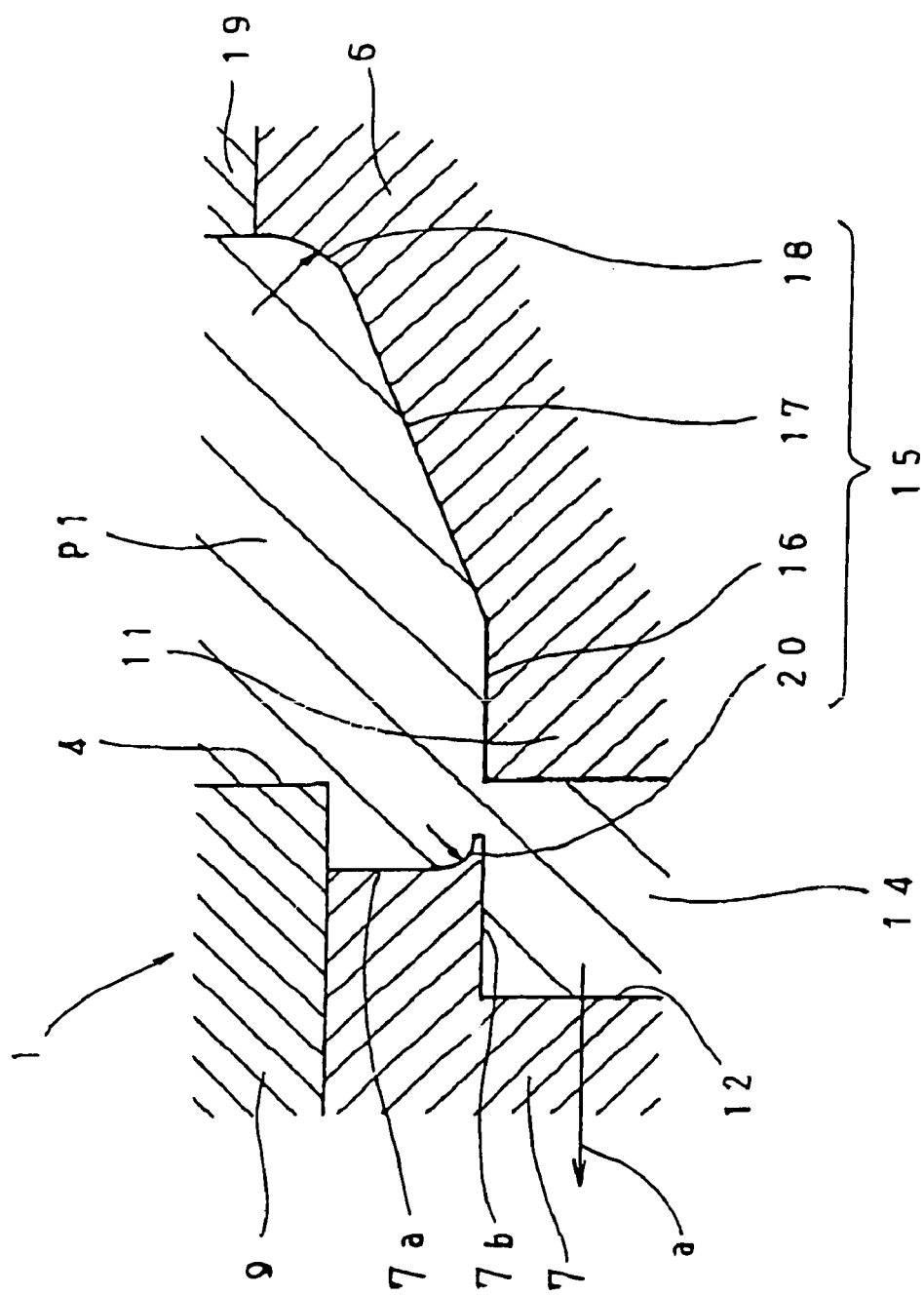
FIG. 14 is a sectional view illustrating a major part of a mold apparatus according to Second Embodiment of the present invention.
Figure 15:
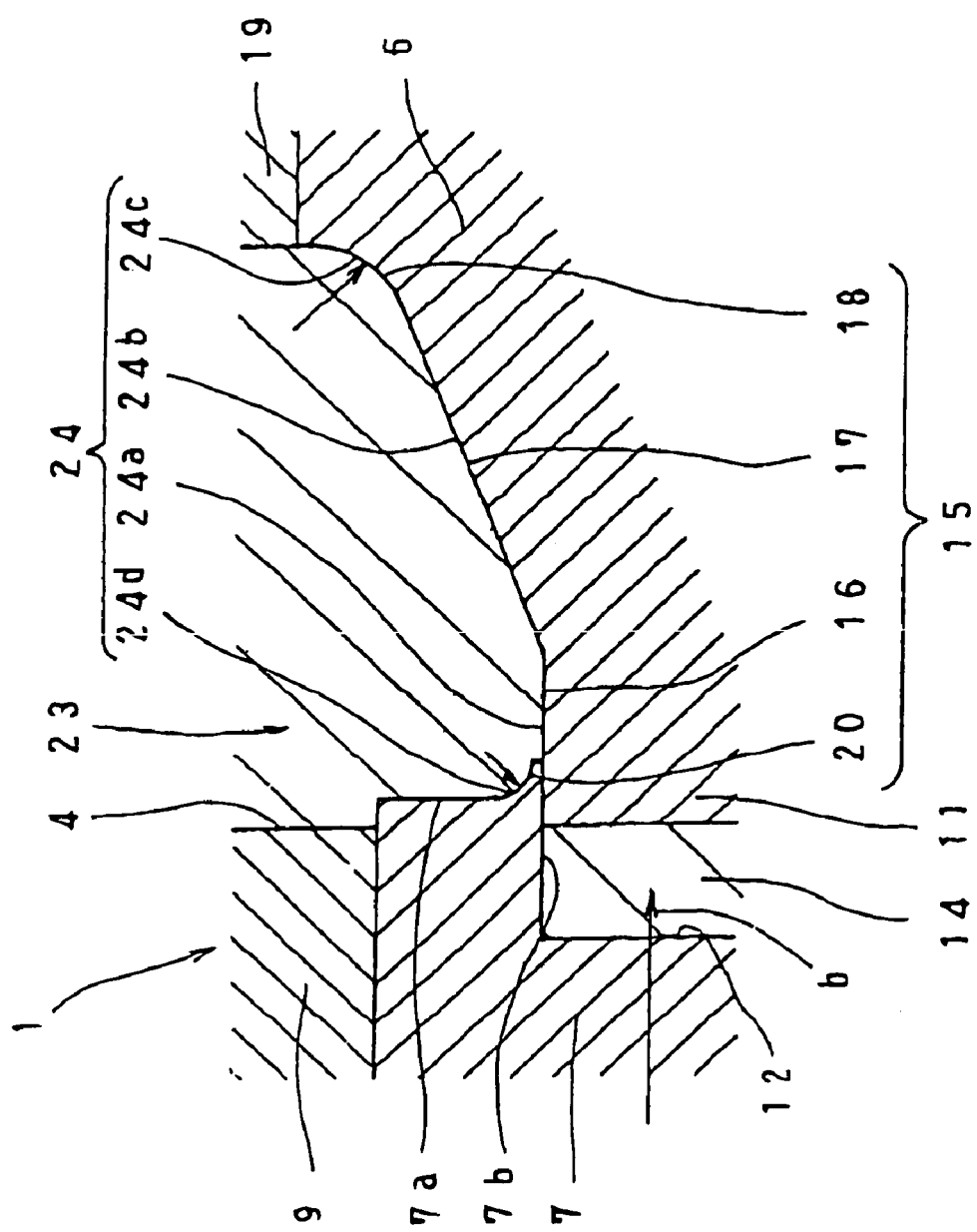
FIG. 15 is a sectional view illustrating the cutting of a gate of FIG. 14.

(5) Description of Second Embodiment of the mold apparatus for injection molding the disk substrate (FIGS. 14 and 15)

Figure 16:
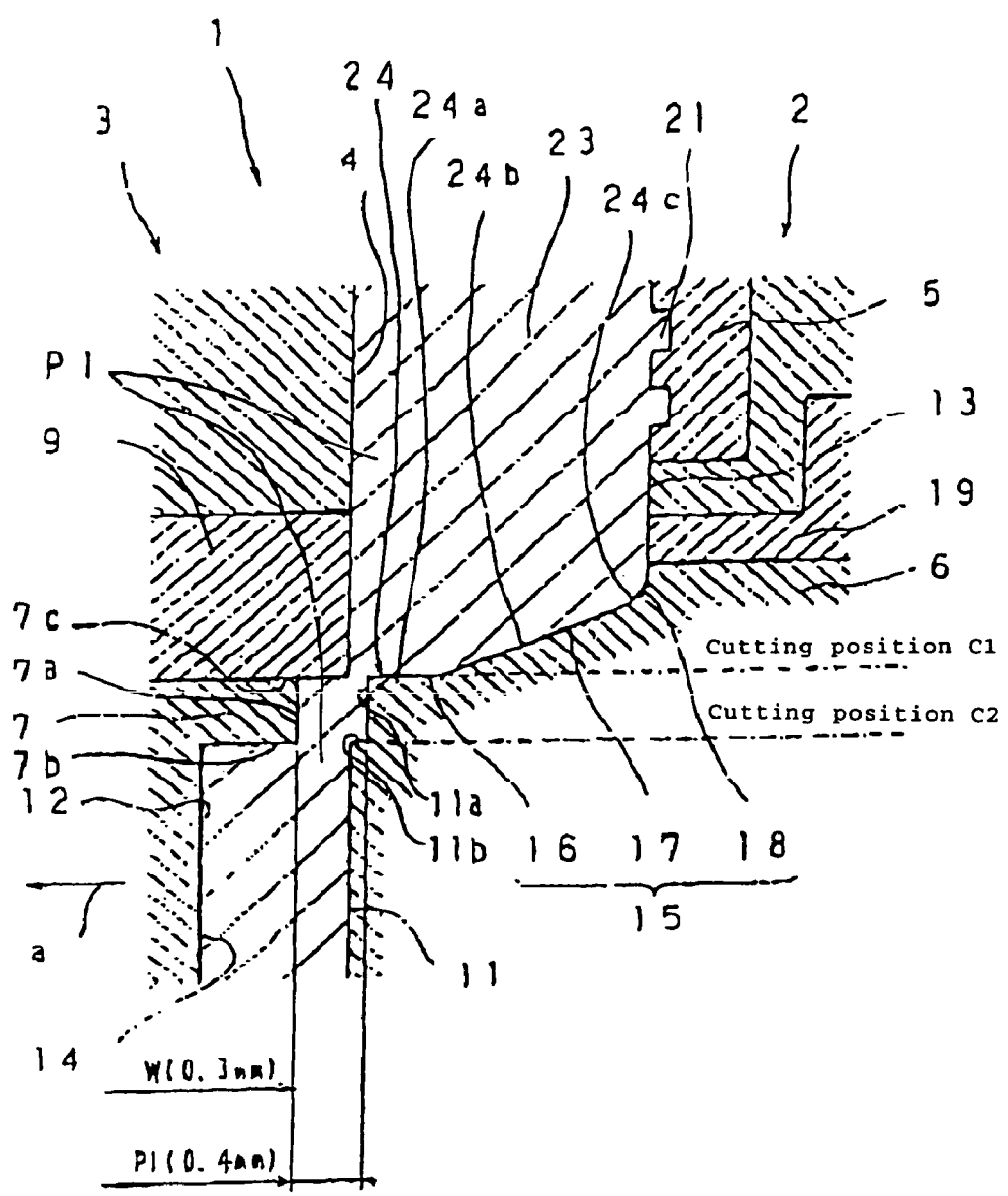
FIG. 16 is a sectional view illustrating a major part of a mold apparatus according to Third Embodiment of the present invention.
Figure 17:
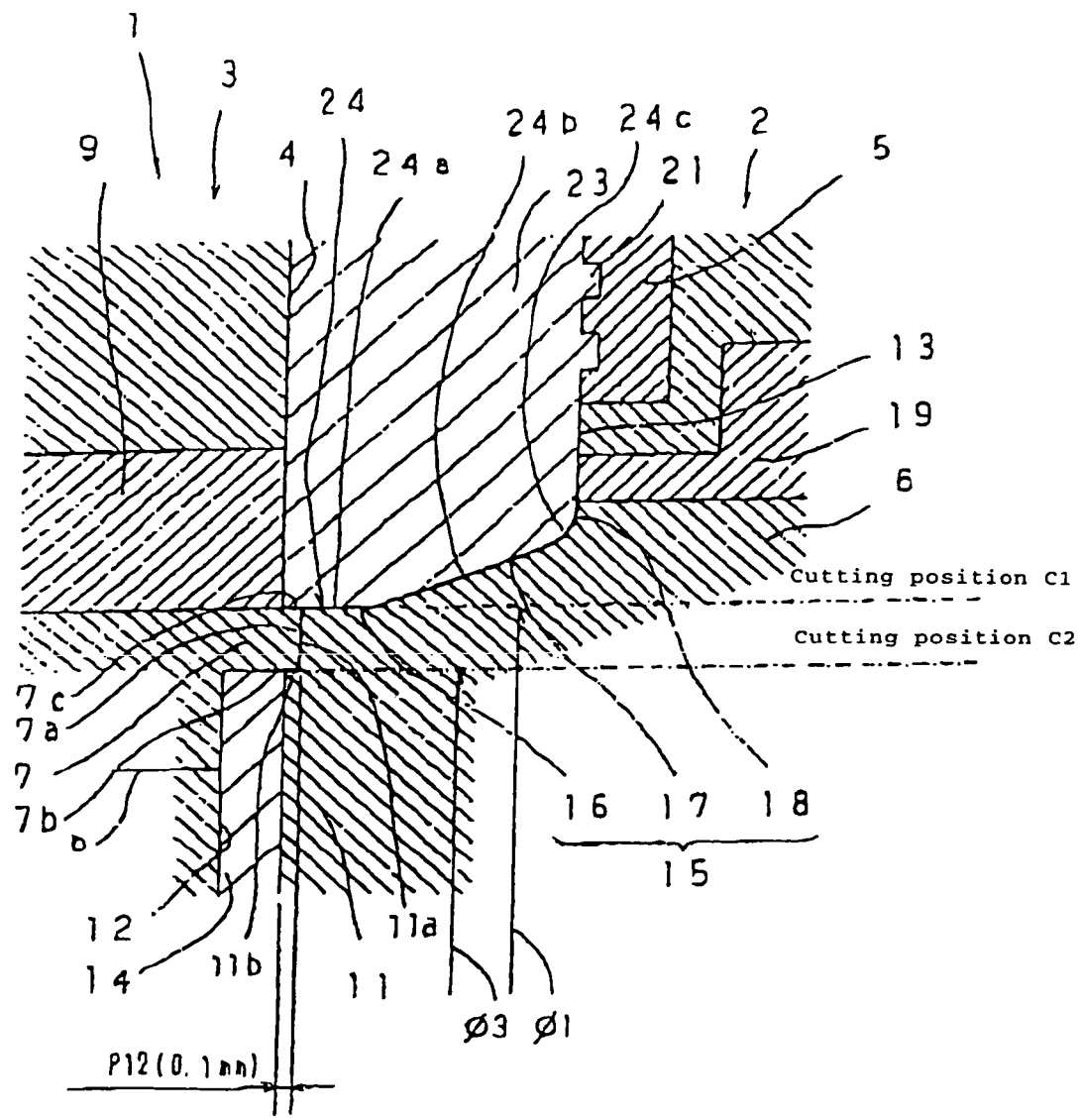
FIG. 17 is a sectional view illustrating the cutting of a gate of FIG. 16.

(6) Description of Third Embodiment of the mold apparatus for injection molding the disk substrate (FIGS. 16 and 17)

Figure 18:
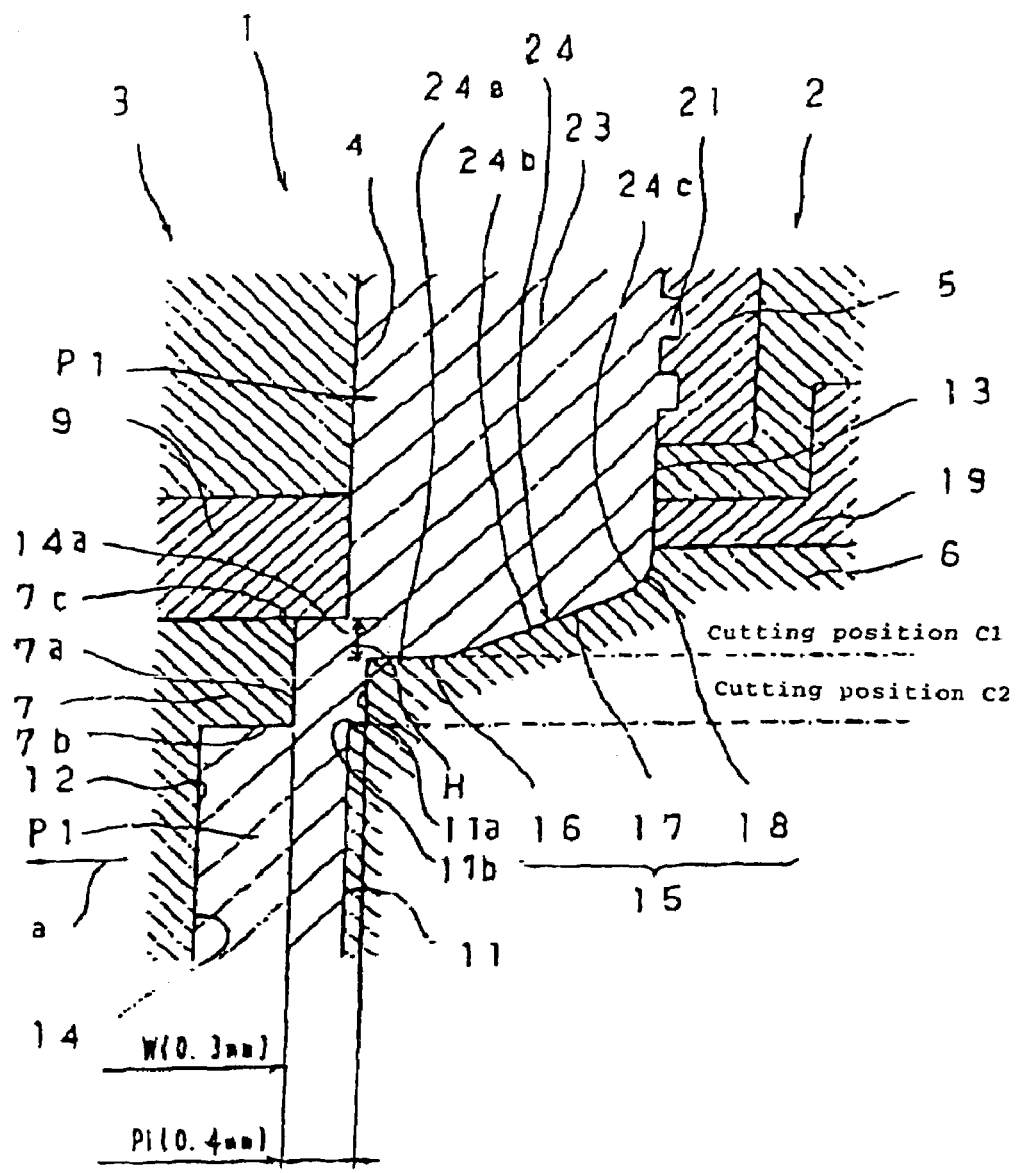
FIG. 18 is a sectional view illustrating a major part of a mold apparatus according to Fourth Embodiment of the present invention.
Figure 19:
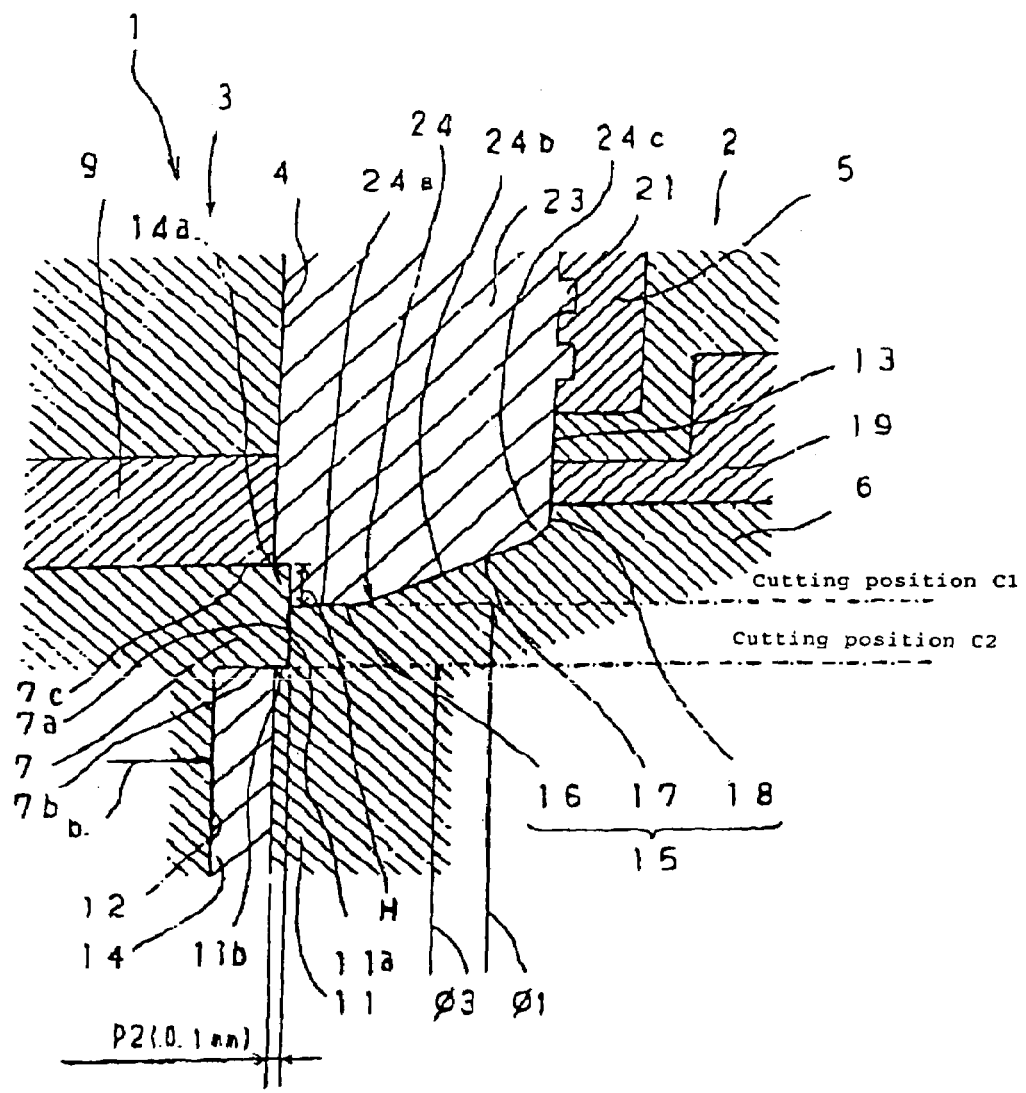
FIG. 19 is a sectional view illustrating the cutting of a gate of FIG. 18.

(7) Description of Fourth Embodiment of the mold apparatus for injection molding the disk substrate (FIGS. 18 and 19)

Figure 20:
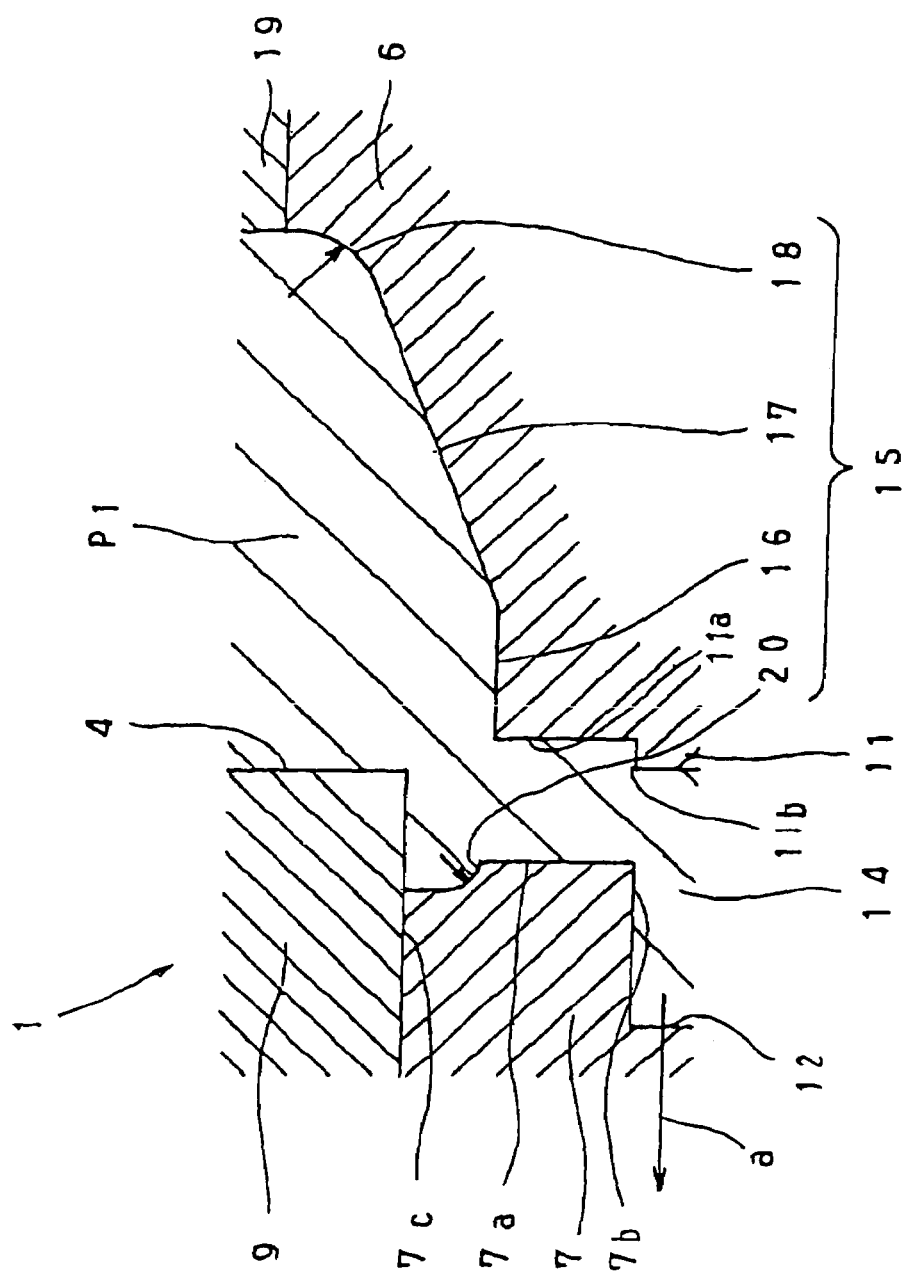
FIG. 20 is a sectional view illustrating a major part of a mold apparatus according to Fifth Embodiment of the present invention.
Figure 21:
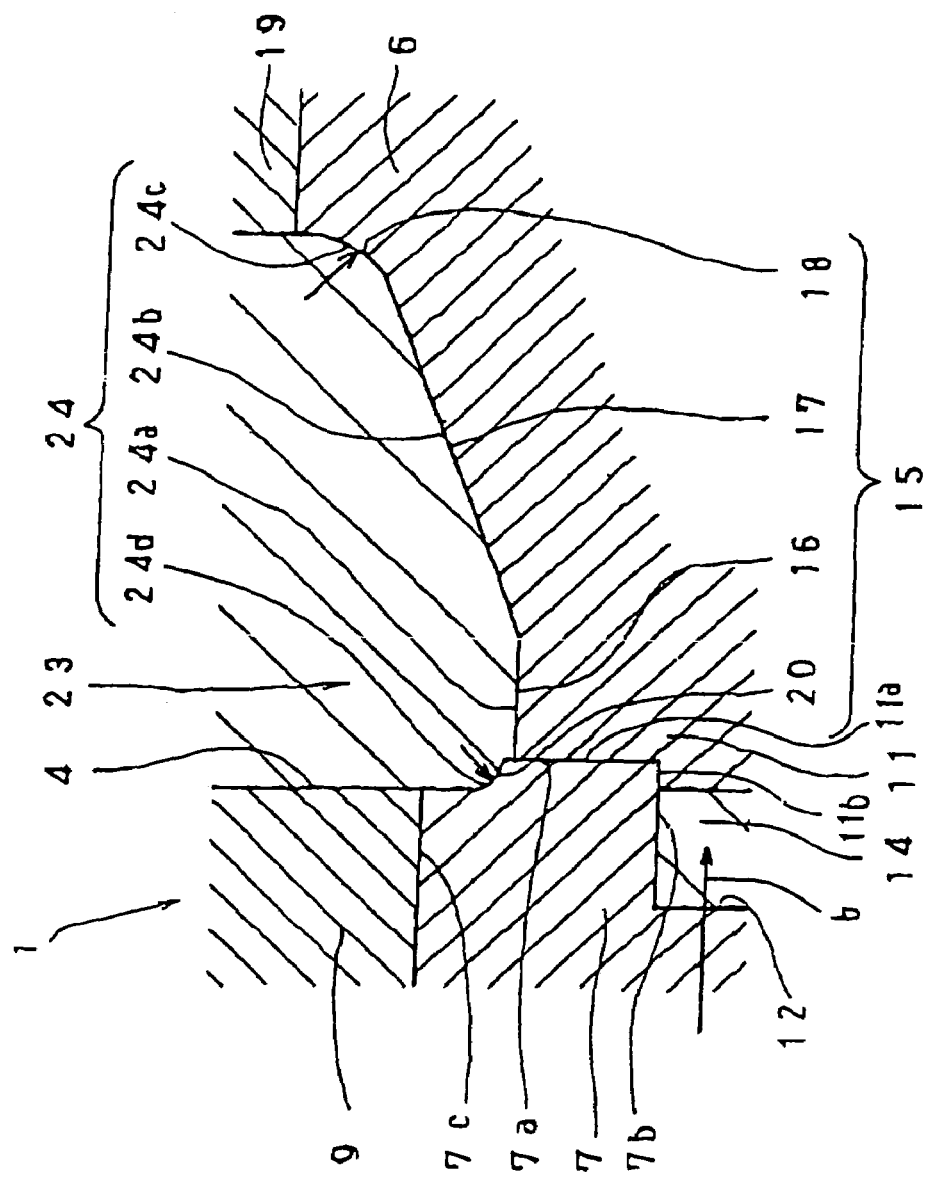
FIG. 21 is a sectional view illustrating the cutting of a gate of FIG. 20.

(8) Description of Fifth Embodiment of the mold apparatus for injection molding the disk substrate (FIGS. 20 and 21)

(1) Description of the Disk Substrate

First, referring to FIGS. 1 and 2, a disk substrate 23 into which a positioning pin of a motor is inserted from the side of a signal transfer surface and which is applied to an optical disk such as DVR will be described. The disk substrate 23 comprising the signal transfer surface 22 to which signals 21 such as pits and a groove representing audio, video or other various kinds of information signals and a servo signal and the like have been transferred in the form of fine roughness such as pits and a groove in the same manner as in the prior art as described later is provided with a center hole 24 which is injection molded simultaneously with the injection molding of the disk substrate 23, as described later.

A straight portion 24*a* with a hole diameter $\phi 1$ parallel to the axial direction is formed on the side of a surface 25 opposite to the signal transfer surface 22 of the center hole 24 injection molded, a tapered portion 24*b* with a hole diameter $\phi 2$ gradually enlarged toward the signal transfer surface 22 is formed between the straight portion 24*a* of the center hole 24 and the signal transfer surface 22, and an edge on the signal transfer surface 22 side of the tapered portion 24*b* is formed to be a first R surface (or first C surface) 24*c*. A second R surface (or second C surface) 24*d* may be formed at an edge on the side opposite to the signal transfer surface 22 side of the center hole 24, as required.

In the case of a disk substrate 23 such as DVR having a diameter of 12 cm, for example, the hole diameter $\phi 1$ of the straight portion 24*a* is set to be 15.05 mm. In addition, the maximum hole diameter $\phi 2$ of the tapered portion 24*b* is set to be 15.09 mm, and the difference between the minimum hole diameter and the maximum hole diameter of the tapered portion 24*b* is set to be about 0.02 mm. The depth D of the straight portion 24*a* is set to be 0.3 mm.

Since the center hole 24 is injection molded and the first R surface (or first C surface) 24*c* is injection molded at the edge on the signal transfer surface 22 side of the center hole 24, naturally, the edge on the signal transfer surface 22 side of the center hole 24 is free of any flash.

As will be described later, when the second R surface (or second C surface) 24*d* is injection molded at the edge on the side of the surface 25 opposite to the signal transfer surface 22 of the center hole 24, the edge on the side opposite to the signal transfer surface 22 of the center hole 24 is also free of flash.

According to this disk substrate 23, as shown in FIG. 1, a tapered positioning center pin 27 of a disk table 26 of a spindle motor used for driving the disk is inserted into the center hole 24 from the side of the signal transfer surface 22 which is a reference surface, and the disk substrate 23 is thereby chucked. Therefore, the center hole 24 is centered with high accuracy owing to the first R surface (or first C surface) 24*c* free of flash, and the eccentricity amount of the disk substrate 23 can be suppressed to be extremely small.

As indicated by dot-dash lines in FIG. 1, the portion of the signals 21 of the disk substrate 23 will later be coated with a light transmission layer 21*a* of about 0.1 mm in thickness.

(2) Description of First Embodiment of the Mold Apparatus for Injection Molding the Disk Substrate Next, referring to FIGS. 3 to 10, First Embodiment of the mold apparatus 1 optimum for injection molding the above-described disk substrate 23 will be described. The mold apparatus 1 is a mold apparatus 1 of a gate cutting system using a fixed-side stamper, in which a cavity 4 as a circular disk form space is vertically formed between faying surfaces of a fixed die 2 and a movable die 3. A stamper 5 is vertically disposed on the fixed die 2 side of the cavity 4, and the innermost circumference of the stamper 5 is fixed to a fixed mirror surface by a mechanical clamp. A cylindrical sprue bushing 6 is horizontally disposed in the fixed die 1 at a central portion of the cavity 4, and a cylindrical gate cutter (called also "punch") 7, a small-diameter ejector pin 8 and a cylindrical ejector 9 are horizontally disposed at positions opposite to the sprue bushing 6. The ejector pin 8 is disposed at the center of the gate cutter 7, and the ejector 9 is disposed at the outer circumference of the gate cutter 7.

A sprue 10 is formed at the center of the sprue bushing 6 to which an injection cylinder (not shown) is connected, and a gate forming projected portion 11 is formed at the tip of the sprue bushing 6. A gate forming recessed portion 12 is formed at the tip of the gate cutter 7, a gate 14 is formed between the gate forming projected portion 11 and the gate forming recessed portion 12, and the gate 14 is formed in a relative to the signal transfer surface 13 which is a surface on the side of the stamper 5. Therefore, the gate cutter 7 is a gate cutter having a recessed type shape for forming the gate 14. The thickness W of the gate 14 is 0.3 mm, and the projection amount P1 of the gate cutter 7 is 0.4 mm. The bite-in amount (overlap amount) P2 of the tip 7*a* of an outer circumferential portion of the gate 7 relative to the sprue bushing 6 at the time of cutting the gate, described later, is set to be about 0.1 mm.

A center hole molding portion 15 for injection molding the center hole 24 of the disk substrate 23 shown in FIGS. 1 and 2 is provided at the outer circumference of the gate forming projected portion 11 of the mold apparatus 1.

Figure 3:
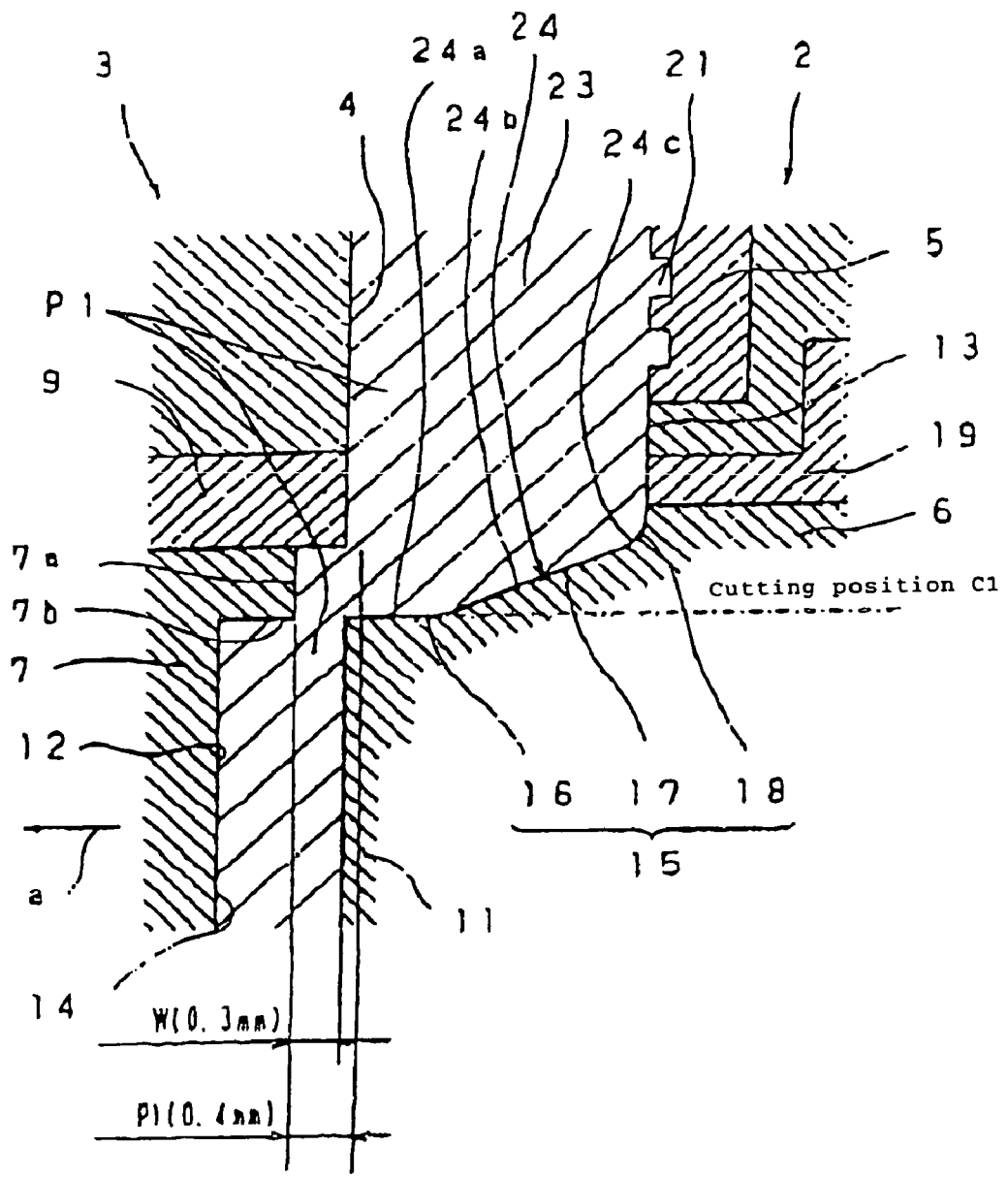
FIG. 3 is an enlarged sectional view of portion A of FIG. 5 which is a part of a gate portion of a mold apparatus according to First Embodiment of the present invention.
Figure 4:
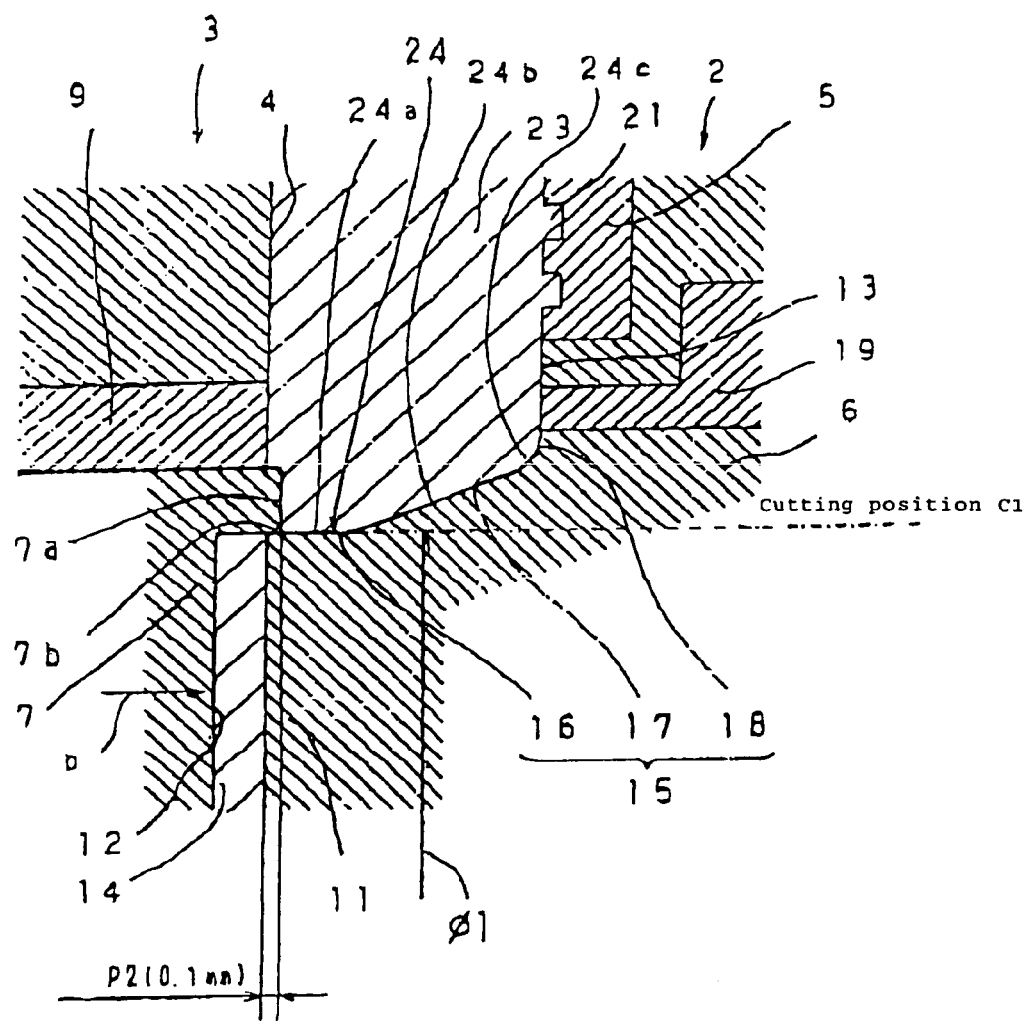
FIG. 4 is a sectional view illustrating the cutting of a gate of FIG. 3.
Figure 5:
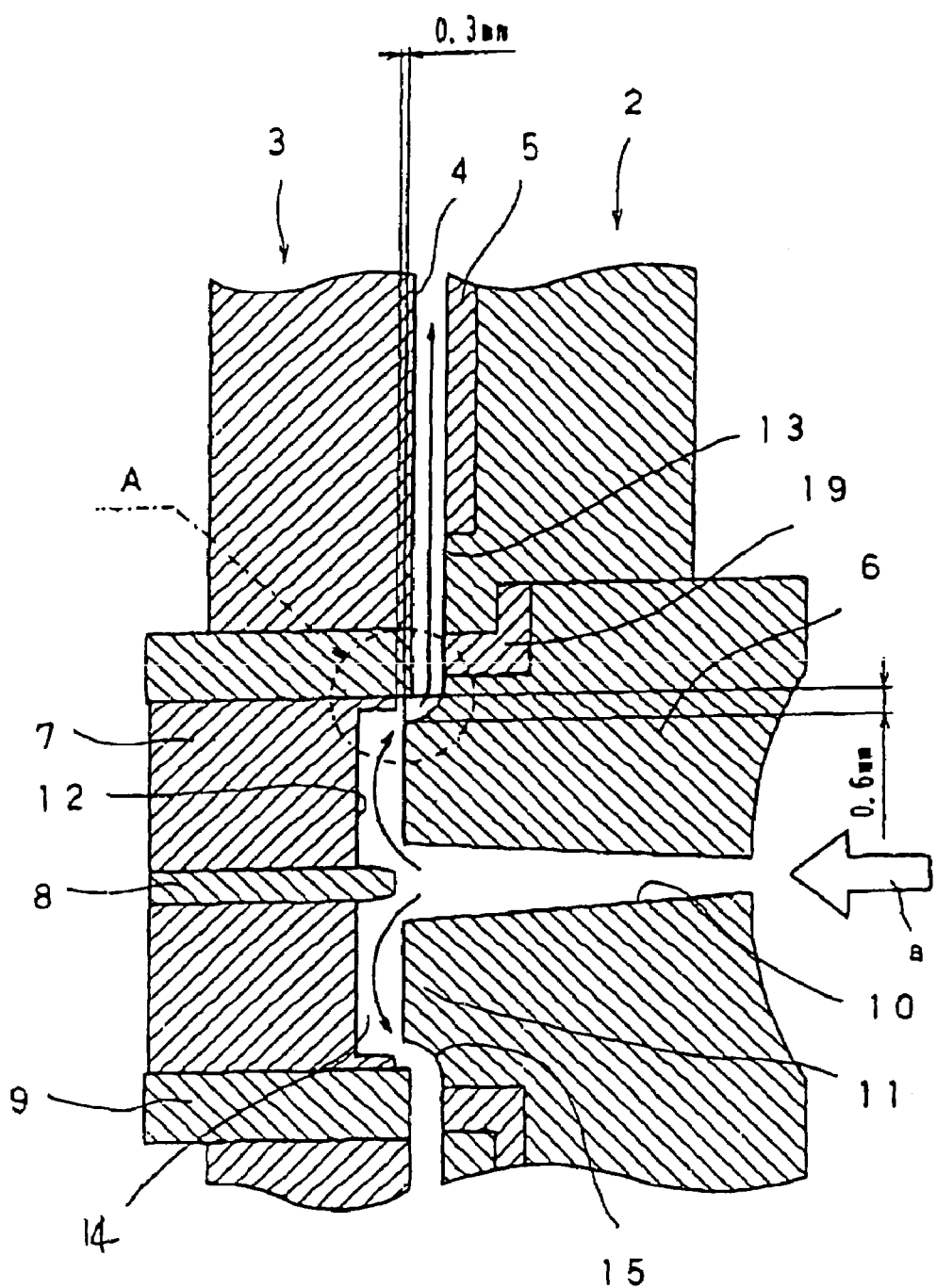
FIG. 5 is a sectional view of the entire part of the gate portion of the mold apparatus according to First Embodiment of the present invention.
Figure 6:
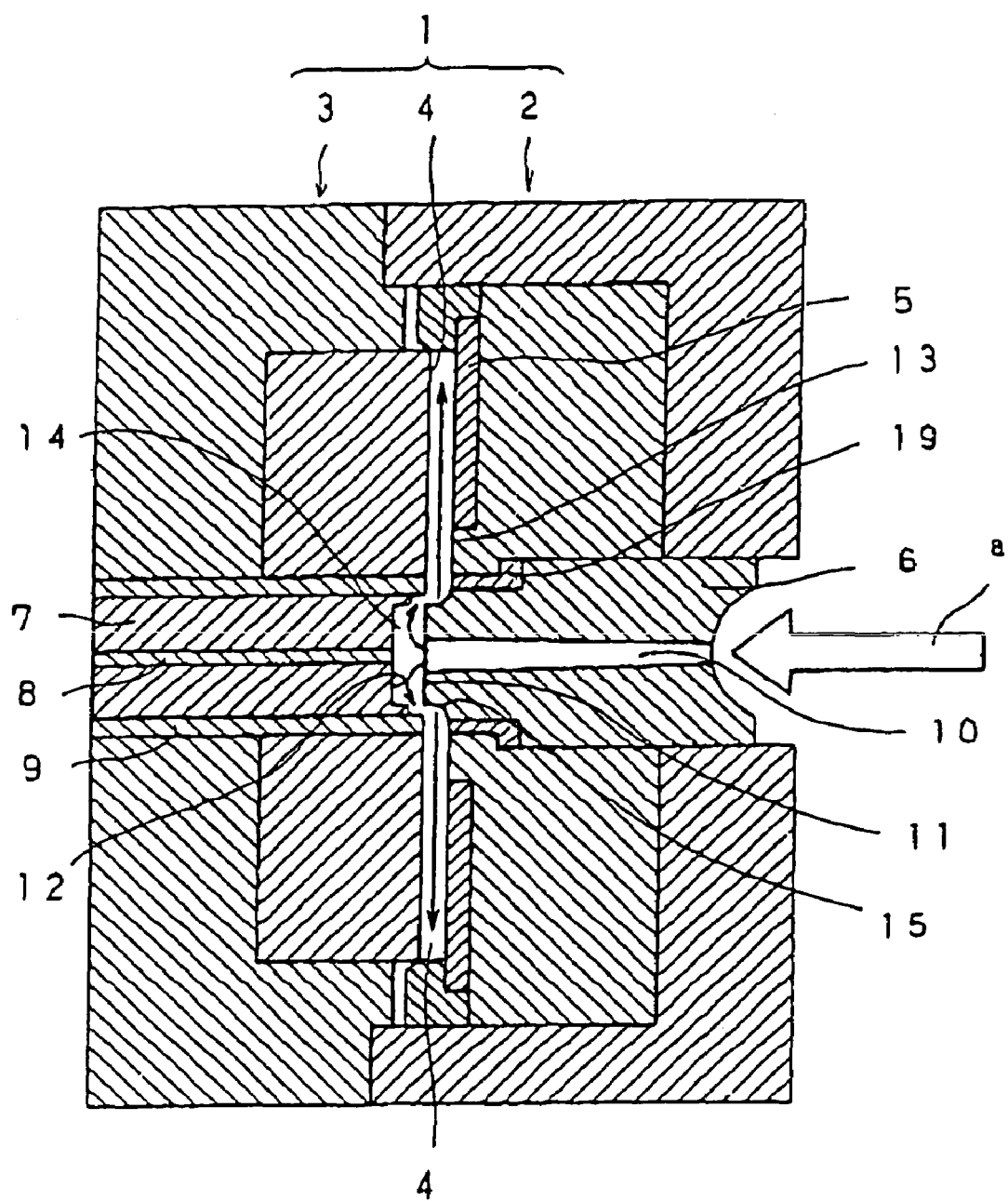
FIG. 6 is a sectional view illustrating the entire part of the mold apparatus of a fixed-side stamper and gate cutting system according to First Embodiment of the present invention.
Figure 7:
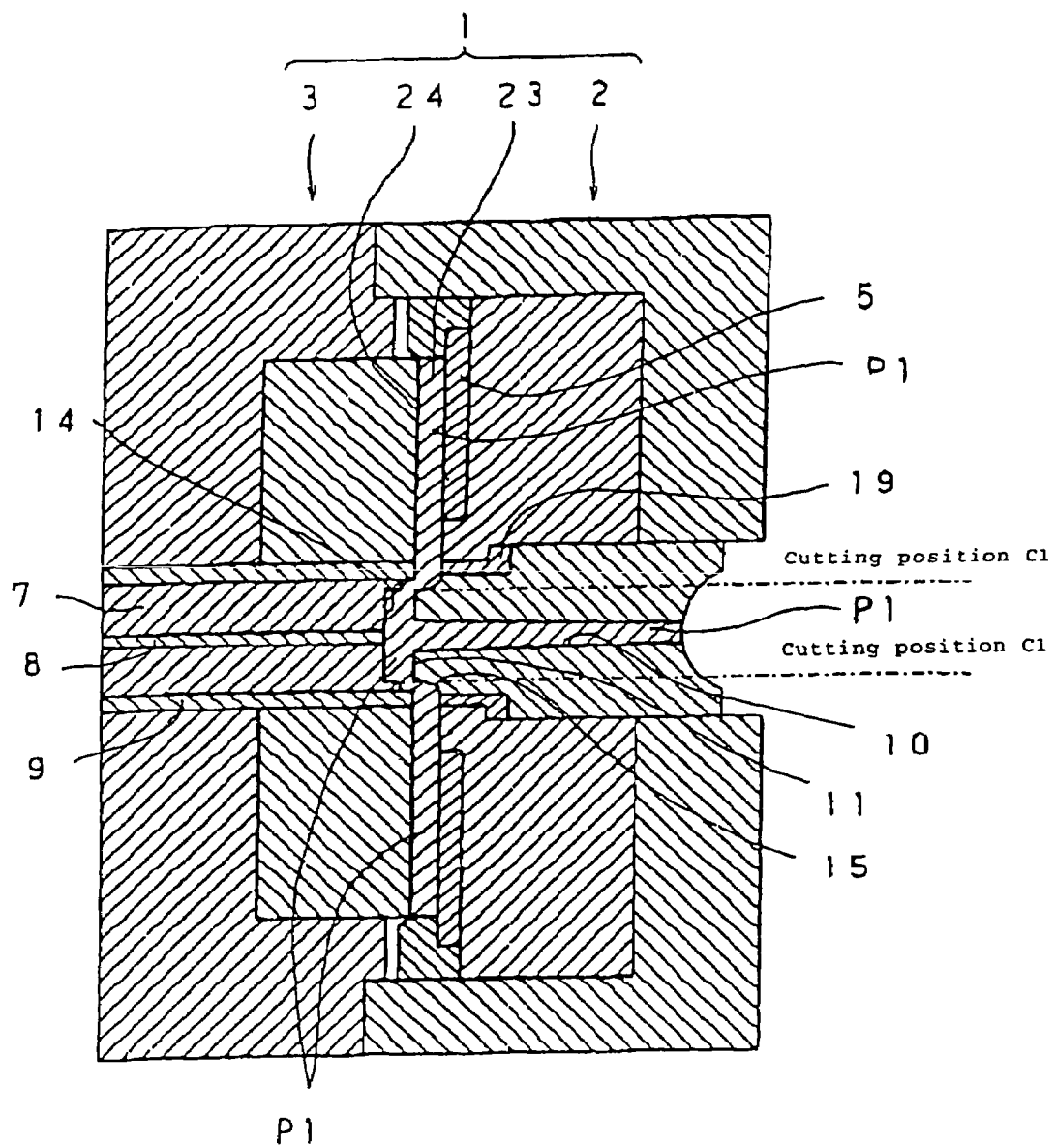
FIG. 7 is a sectional view in the condition where a molten resin is injected into the mold apparatus of FIG. 6.

Namely, as shown in FIGS. 3 to 5, a straight molding portion 16 for molding the center hole 24*a*, a taper molding portion 17 for molding the tapered portion 24*b*, and a first R surface (or first C surface) molding portion 18 for molding the first R surface (or first C surface) 24*c* are provided at the outer circumference of the gate forming projected portion 11.

Figure 8:
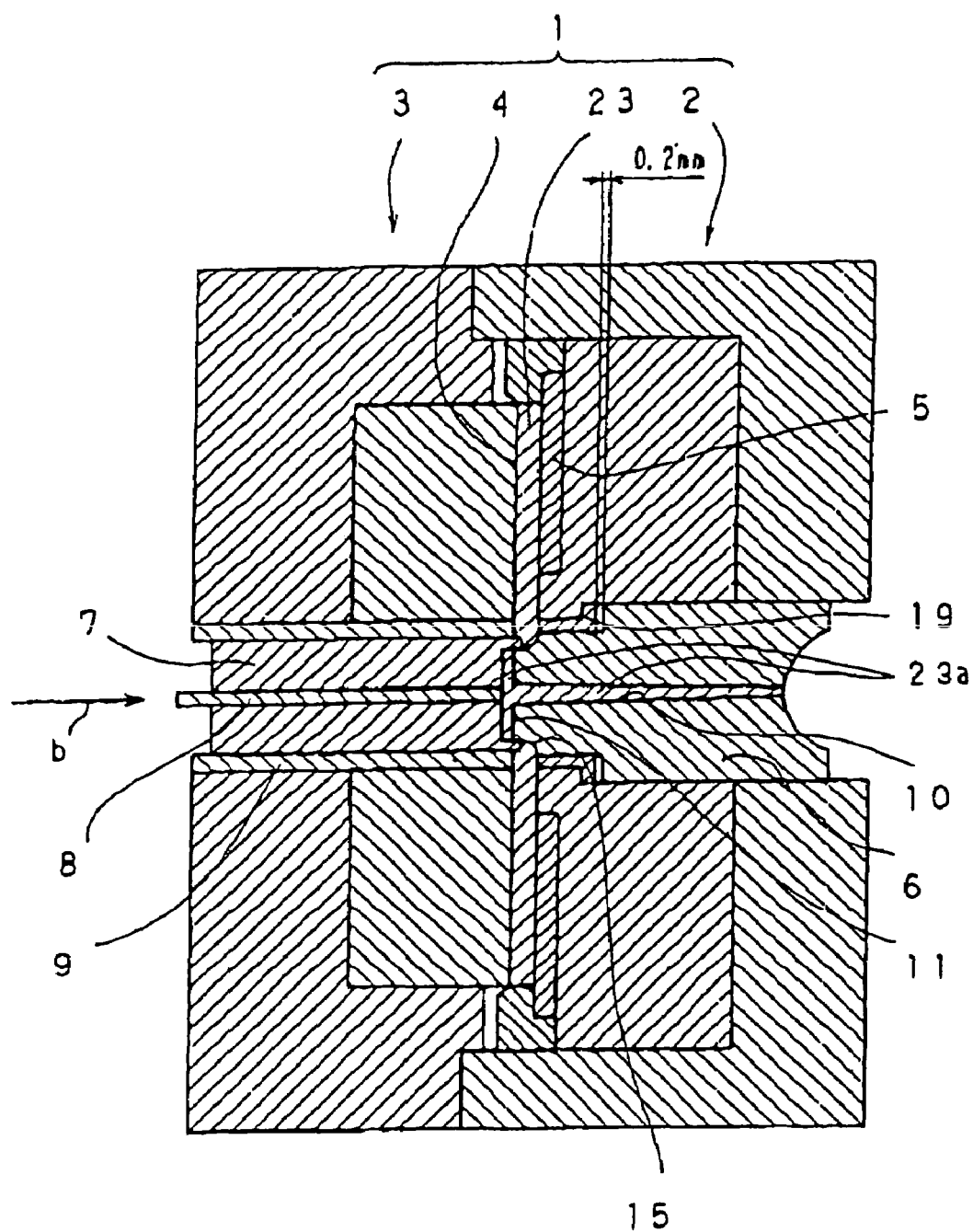
FIG. 8 is a sectional view illustrating the cutting of the gate of the mold apparatus of FIG. 7.

As shown in FIG. 8, an auxiliary ejector pin 19 with a projection amount of about 0.2 mm is auxiliarily assembled at the outer circumference of the tip of the sprue bushing 6 of the fixed die 2. The auxiliary ejector pin 19 is advanced by fixed air.

Next, injection molding of the disk substrate 3 by the mold apparatus 1 of the gate system will be described. First, as shown in FIGS. 3 to 7, in the condition where the fixed die 2 and the movable die 3 are heated, a plasticized molten resin P1 constituted of polycarbonate or other synthetic resin is injected from the injection cylinder into the sprue 10 in the direction of arrow a, and is charged under pressure into the cavity 4 through the gate 14. In this case, during or after the charging of the molten resin P1, the movable die 3 is pressed at a high pressure to the side of the fixed die 2 by a pressure cylinder disposed on the back side of the movable die 3. The molten resin P1 compressed at a high pressure in the cavity 4 is pressed against a fine roughness surface of the stamper 5, to thereby injection mold the disk substrate 23 wherein the signals 2 such as information signals and a tracking servo signal have been transferred to the signal transfer surface 22 in the form of pits, a groove and the like, as shown in FIGS. 1 and 2.

Besides, at the time of injection molding the disk substrate 23, the straight portion 24*a*, the tapered portion 24*a* and the first R surface (or first C surface) 24*c* of the center hole 24 are simultaneously molded by the straight molding portion 16, the taper molding portion 17 and the first R surface (or first C surface) molding portion 18 in the center hole molding portion 15 at the outer circumference of the gate forming projected portion 11.

Next, as shown in FIGS. 4 and 8, the gate cutter 7 is advanced (projected) in the direction of b by the projection amount P1 of 0.4 mm shown in FIG. 3, whereby gate cutting by 0.3 mm is performed between the inner circumferential surface 7*b* of the tip of the outer circumferential portion 7*a* of the gate 14 of the gate cutter 7 and the straight molding portion 16 which is the outer circumferential surface of the gate forming projected portion 11 of the sprue bushing 6.

Figure 9:
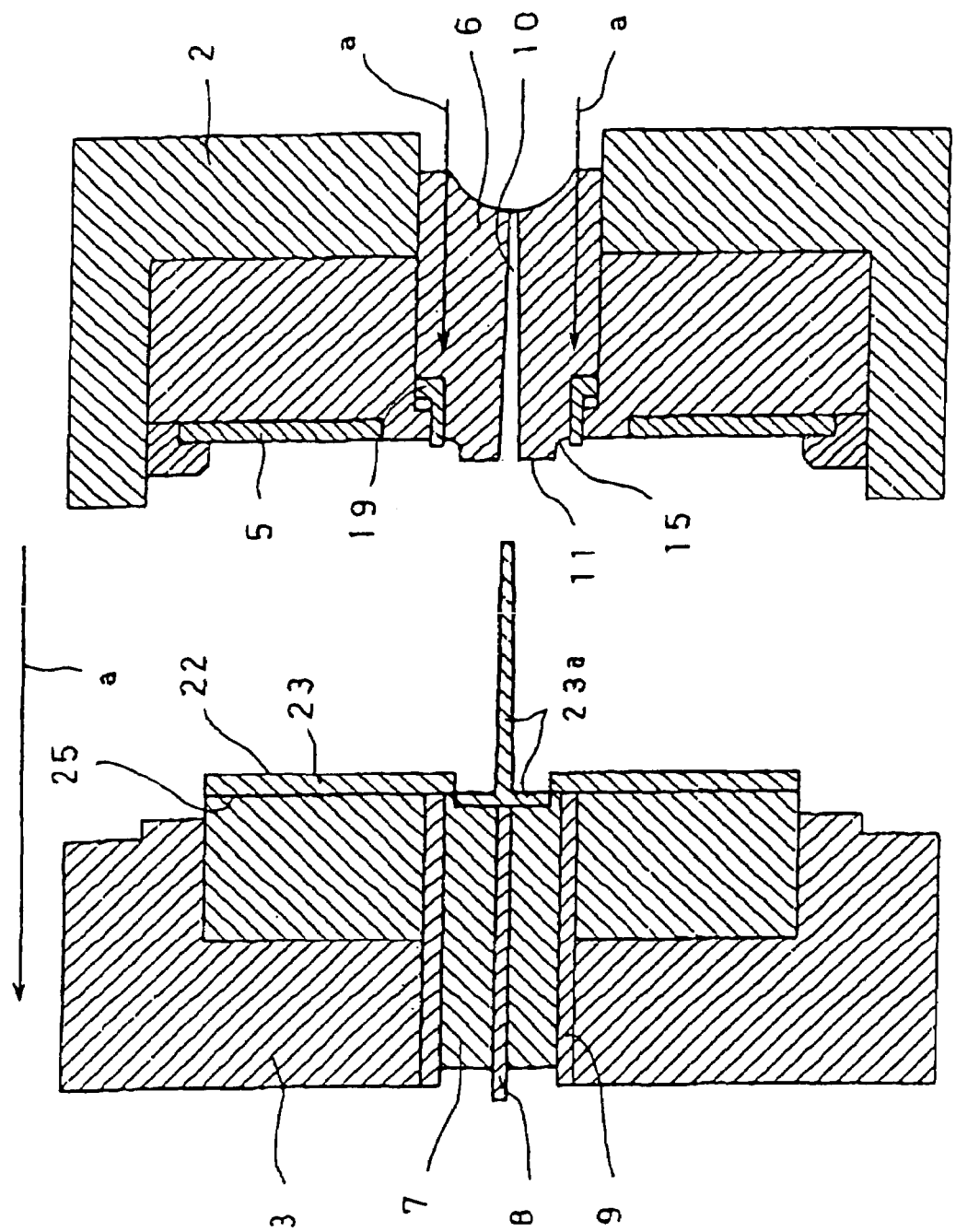
FIG. 9 is a sectional view at the time when the mold apparatus of FIG. 8 is opened.
Figure 10:
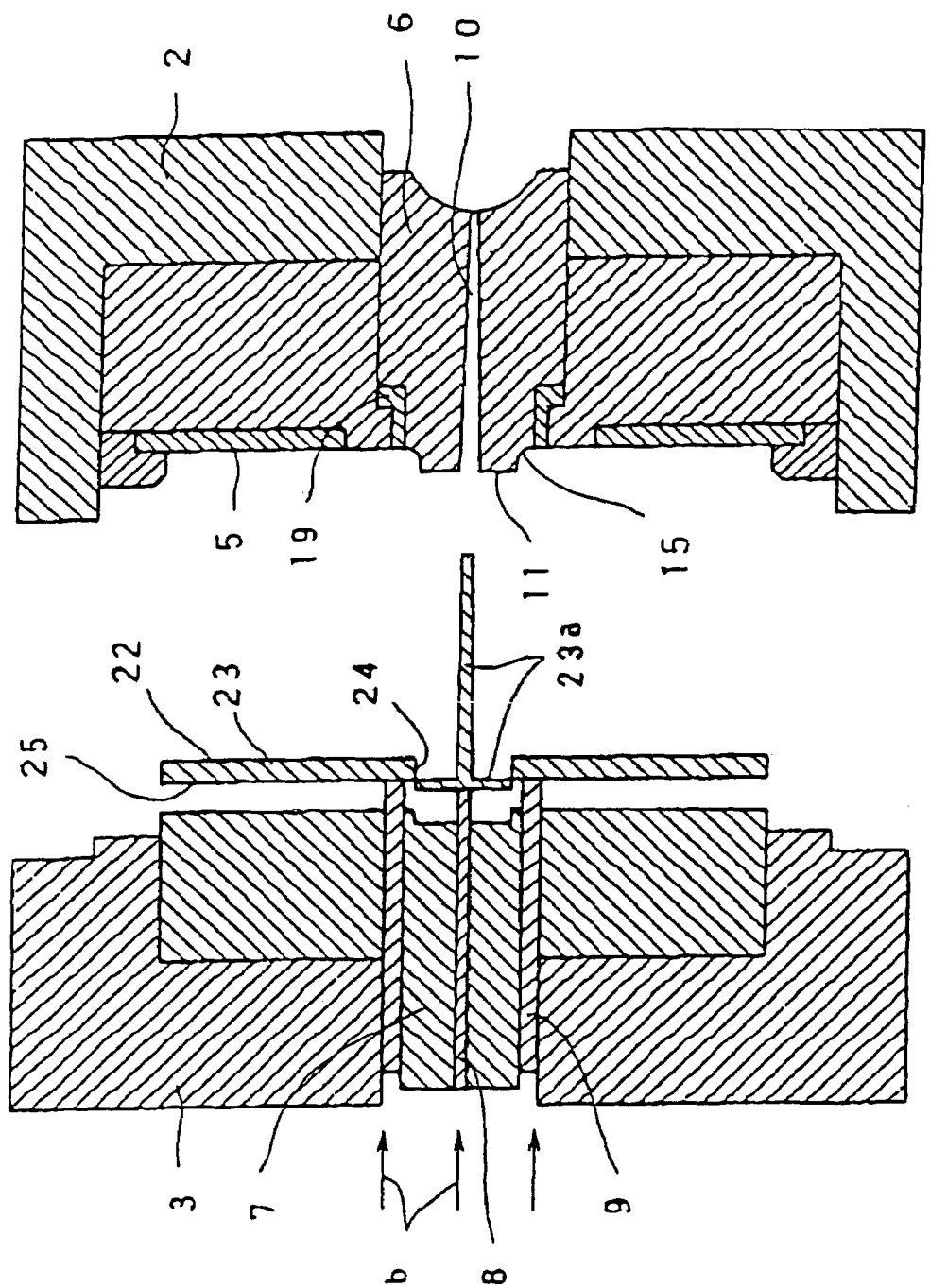
FIG. 10 is a sectional view at the time when a disk substrate is stripped from a movable die of the mold apparatus of FIG. 9.

Then, after the fixed die 2 and the movable die 3 are cooled for about 10 sec, the pressure of the injection cylinder is lowered; then, as shown in FIG. 9, air is blown from an outer circumferential portion of the sprue bushing 6 of the fixed die 2 in the direction of arrow a, and the auxiliary ejector pin 19 is auxiliarily projected in the direction of arrow a, whereby the movable die 3 is sufficiently opened in the direction of arrow a. By this, the injection-molded disk substrate 23 in the condition of being sucked onto the movable die 3 is pulled away from the stamper 5 of the fixed die 2 in the direction of arrow a, and a sprue and gate remaining resin 23*a* which has been remaining in the sprue 10 and the gate 14 is also pulled away from the sprue bushing 6 in the direction of arrow a. Thereafter, as shown in FIG. 10, the ejector 9 of the movable die 3 is advanced in the direction of arrow b, whereby the injection-molded disk substrate 23 is stripped from a movable mirror surface of the movable die 3 in the direction of arrow b. Simultaneously, the sprue and gate remaining resin 23*a* is also stripped in the direction of arrow b by the ejector pin 8.

Finally, as shown in FIG. 11, the disk substrate 23 and the sprue and gate remaining resin 23*a* are chucked by a robot 32 of a disk substrate taking-out apparatus 31, and are taken out of the movable die 3, and the disk substrate 23 is transferred onto an aligning machine (not shown).

(3) Description of the Disk Substrate Taking-Out Apparatus

Next, the disk substrate taking-out apparatus 31 will be described referring to FIGS. 11 and 11. For the ejection apparatus 31, the robot 32 is used, as in the prior art.

First, when injection molding is conducted by the mold apparatus 1 of the gate system described above and the movable die 3 is opened as shown in FIG. 10, the sprue and gate remaining resin 23*a* is projected from the center hole 24 of the disk substrate 23 to the side of the surface 25 opposite to the signal transfer surface 22.

Therefore, as indicated by dot-dash lines in FIG. 11, a suction pad 33 of the robot 32 is suction attracted onto the signal transfer surface 22 side of an outer circumferential portion of the center hole 24 of the disk substrate 23, thereby chucking the disk substrate 23, then the disk substrate 23 together with the sprue and gate remaining resin 23*a* is pulled away from the movable die 3, and thereafter, in the same manner as in the prior art, the disk substrate 23 is transferred from the movable die 3 in the direction of arrow a, when the sprue and gate remaining resin 23*a* would interfere with the opposite surface 25 of the disk substrate 23 at the portion of the center hole 24, so that the disk substrate 23 cannot be transferred onto the aligning machine or the like.

To cope with this problem, in the disk substrate taking-out apparatus 31, as shown in FIG. 11, an air jet nozzle 34 which is a discharging means is fitted at a position opposite in the direction of arrow a to the sprue and gate remaining resin 23*a*, and air is jetted from the air jet nozzle 34 in the direction of arrow a, whereby the sprue and gate remaining resin 23*a* can be easily discharged in the direction of arrow a to the side of the opposite surface 25 through the center hole 24 of the disk substrate 23.

Figure 27:
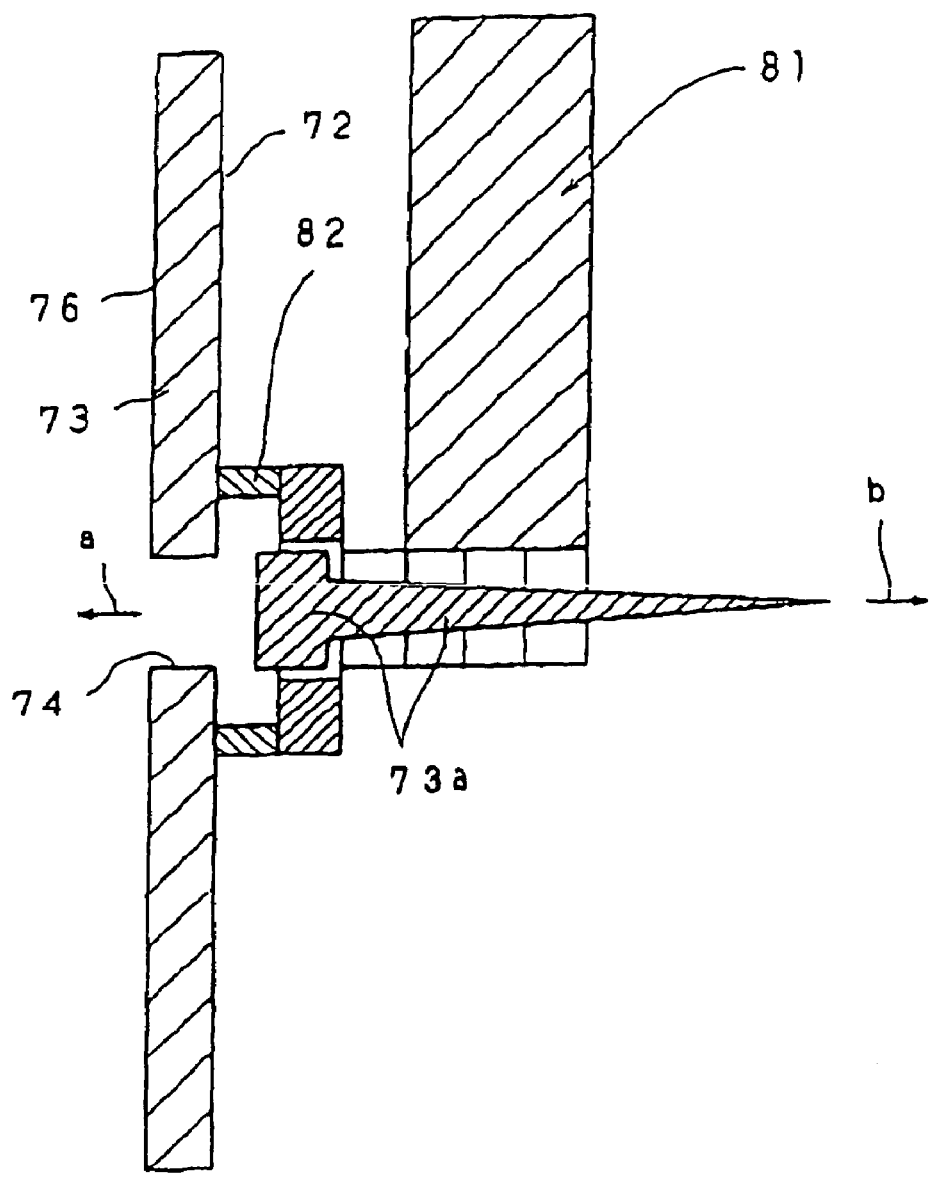
FIG. 27 is a sectional view illustrating a disk substrate taking-out robot according to the prior art.

Therefore, according to the disk substrate taking-out apparatus 31, the sprue and gate remaining resin 23*a* is projected to the side of the opposite surface 25 of the disk substrate 23 when the movable die 3 is opened. Thus, notwithstanding the position of the sprue and gate remaining resin 23*a* relative to the disk substrate 23 is reverse to that in the case of the prior art shown in FIG. 27, the sprue and gate remaining resin 23*a* can easily be discharged in the direction of arrow a without generating any trouble and before the start of transfer of the disk substrate 23 onto the aligning machine (not shown) by the robot 32, by a method in which air is jetted from the air jet nozzle 34 of the robot 32 immediately after the disk substrate 23 is chucked by the suction pad 33 of the robot 32. Therefore, after the sprue and gate remaining resin 23*a* is discharged, the disk substrate 23 can be smoothly transferred onto the aligning machine (not shown) by the robot 32, to be aligned, in the same manner as in the prior art.

Figure 22:
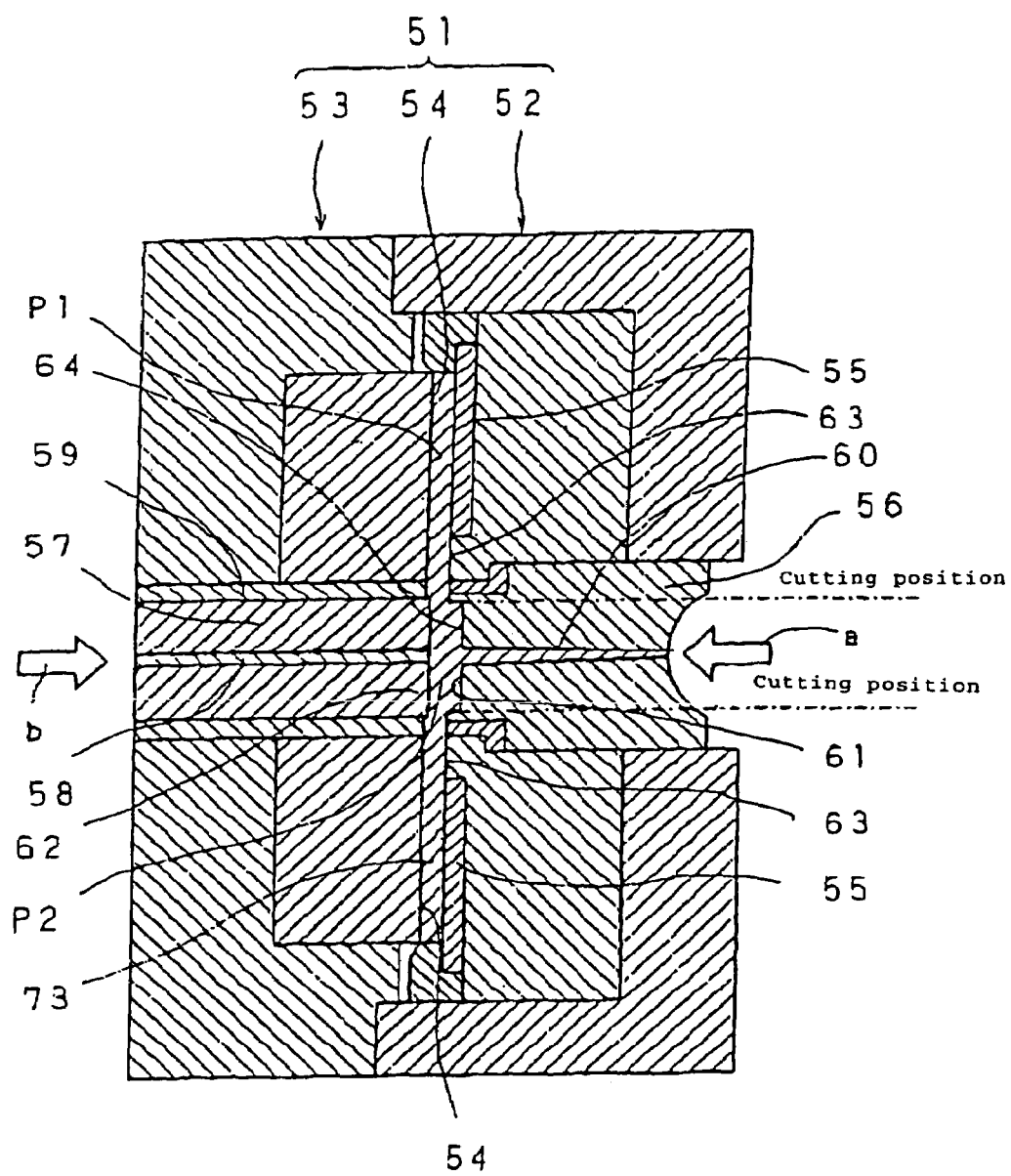
FIG. 22 is a sectional view illustrating a mold apparatus of a fixed-side stamper type according to the prior art.
Figure 23:
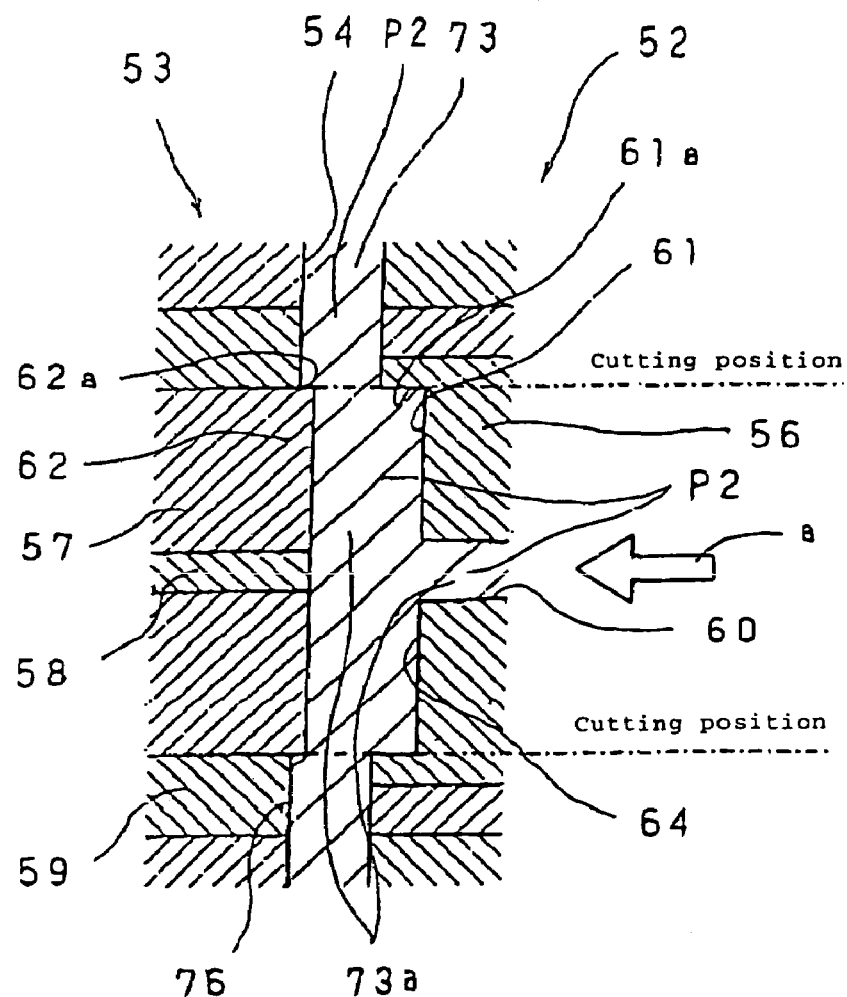
FIG. 23 is an enlarged sectional view of a gate of the mold apparatus of FIG. 22.
Figure 24:
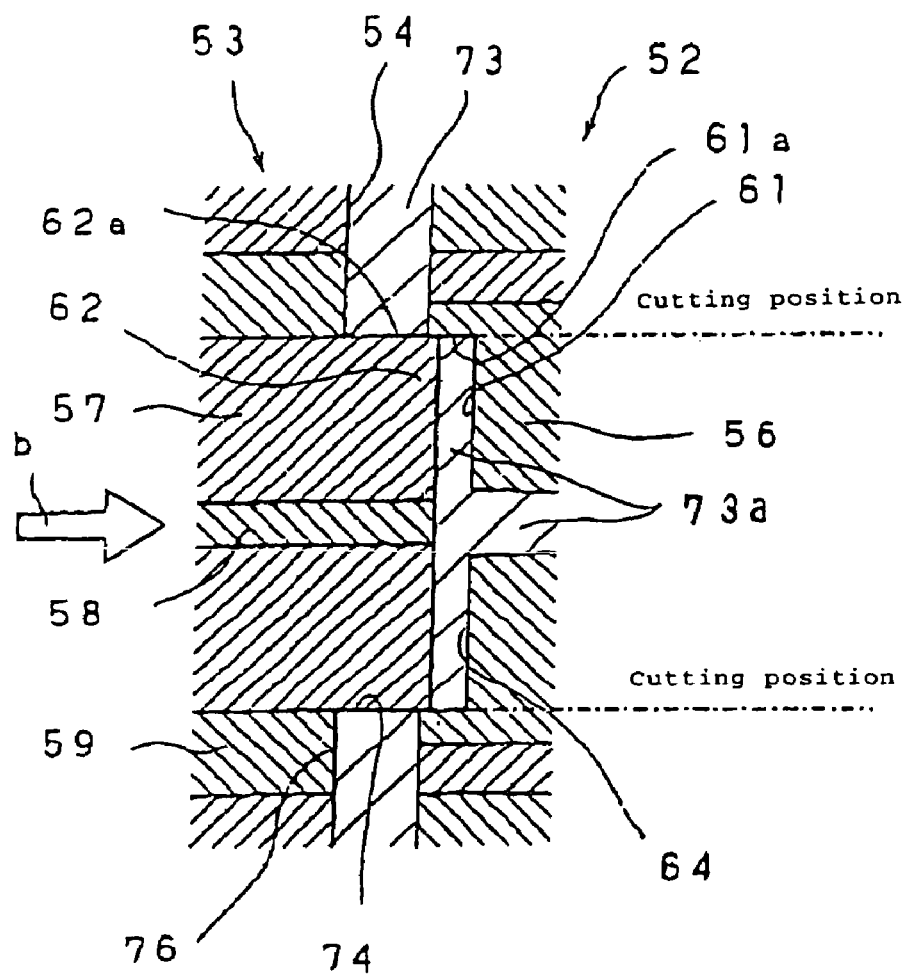
FIG. 24 is a sectional view showing the manner of cutting of the recessed gate of FIG. 23.
Figure 25:
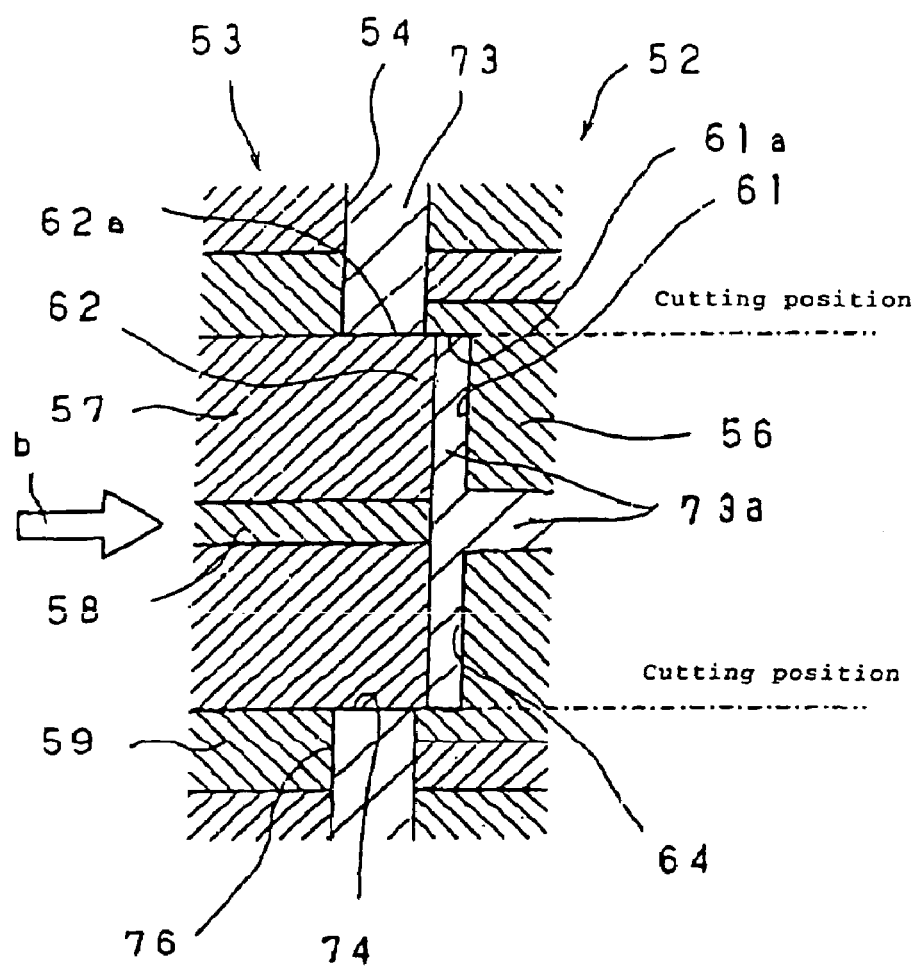
FIG. 25 is a sectional view of a center hole portion of a disk substrate injection molded by a mold apparatus of a fixed-side stamper type according to the prior art.
Figure 26:
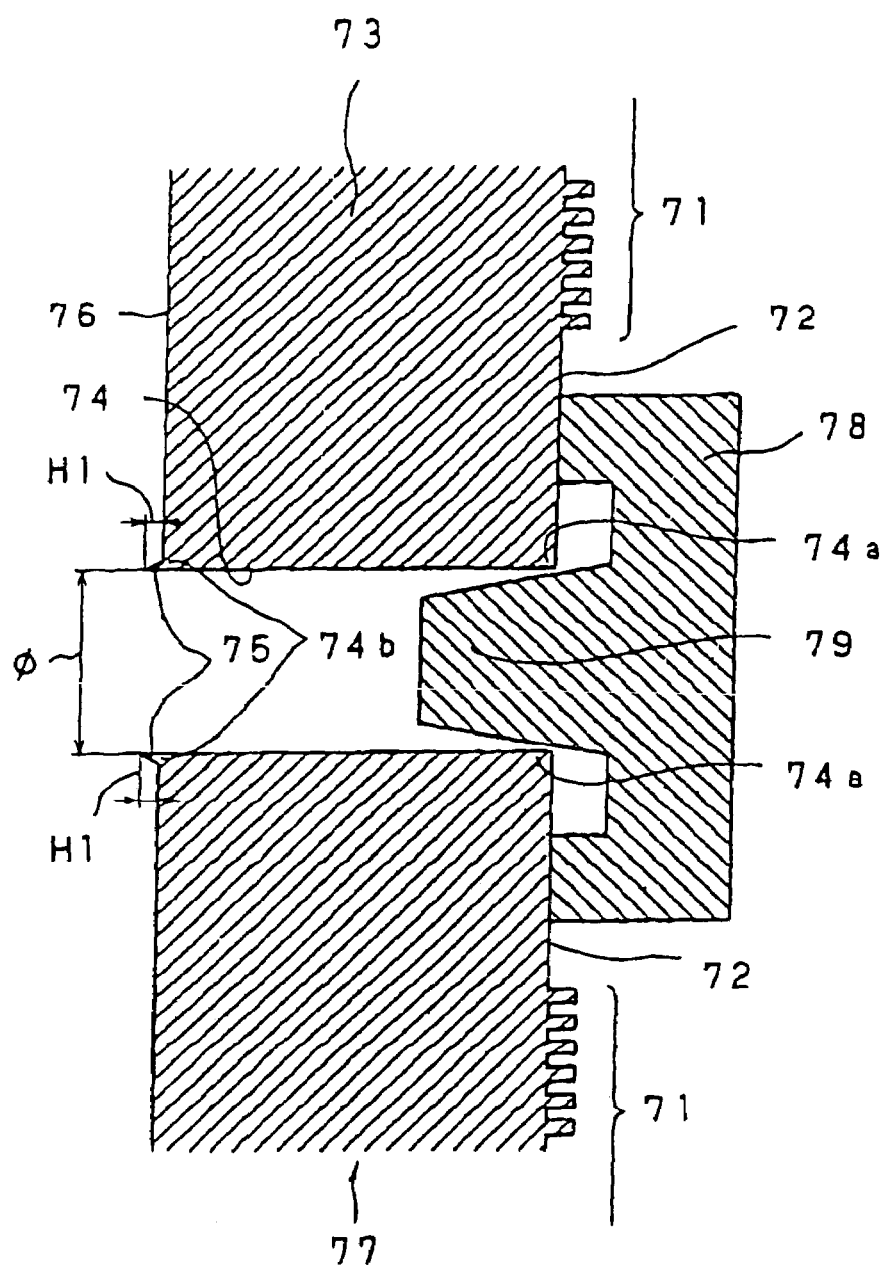
FIG. 26 is a sectional view of a center hole portion of a disk substrate injection molded by a mold apparatus of a movable-side stamper type according to the prior art.

(4) Description of Measurement Results of Eccentricity Amount of the Disk Substrate Next, referring to the table shown in FIG. 13, the measurement results of eccentricity amount of the disk substrate 23 will be described. Example 1 shows the results of ten measurements of eccentricity amount of a disk substrate 23 injection molded by the mold apparatus 1 according to the present invention. Comparative Example 1 shows the results of ten measurements of eccentricity amount of a movable-side stamper substrate which is a conventional disk substrate 73 injection molded by a conventional mold apparatus in which a stamper is disposed on the movable die side. Comparative Example 2 shows the results of ten measurements of eccentricity amount of a fixed-side stamper substrate which is a conventional disk substrate 73 shown in FIG. 25, injection molded by the conventional mold apparatus 51 in which the stamper 55 is disposed on the side of the fixed die 52 as described referring to FIG. 22. Further, Comparative Example 3 shows the results of ten measurements of eccentricity amount of the fixed-side stamper substrate of Comparative Example 2 from which the flash 75 has been removed by a reamer.

The measurement of eccentricity amount was conducted by a method in which the disk substrate is chucked by a positioning center pin of a spindle motor, the disk substrate is driven to rotate at a fixed speed while applying a focusing servo to the spindle motor, and the eccentricity amount is calculated from the number of grooves in an eccentric portion of the spiral groove.

As is clear from the comparative data shown in the table in FIG. 13, the eccentricity amount of the disk substrate 23 according to the present invention was 20 to 30 μm, which is the smallest. The eccentricity amount of the movable-side stamper substrate shown in Comparative Example 1 was 20 to 30 μm, equivalent to that according to the present invention. As described above, however, in the case of the movable-side stamper substrate, the disk substrate is rapidly cooled after the mold is opened, and the pits and the groove are deformed, so that the disk substrate obtained is not suitable as a disk for high-density recording.

In the case of the conventional fixed-side stamper substrate shown in Comparative Example 2, the eccentricity amount was largely dispersed in the range of 15 to 70 μm, due to the presence of the flash 75 as described above, which makes it impossible to establish a system with such a disk substrate.

In the case of the fixed-side stamper substrate from which the flash 75 was removed by a reamer as shown in Comparative Example 3, the eccentricity amount was as small as 20 to 30 μm. As described above, however, there are the problems of generation of tailings and an increase in the number of working steps, leading to a lower yield and a higher cost.

(5) Description of Second Embodiment of the Mold Apparatus for Injection Molding the Disk Substrate Next, referring to FIGS. 14 and 15, Second Embodiment of the mold apparatus 1 will be described. In this case, a second R surface molding portion (or a second C surface molding portion) 20 is provided at a corner portion on the inner circumference side of the tip surface of an outer circumferential portion 7*a* of the gate forming recessed portion 12 of the gate cutter 7.

As shown in FIG. 14, a molten resin P1 is injected into the cavity 4 through the gate 14, thereby molding the disk substrate 23. At a time point when the molten resin P1 is solidified to a certain extent (a time point when the disk substrate 23 can be compressed), the gate cutter 7 is advanced in the direction of arrow b to perform gate cutting by 0.3 mm, as shown in FIG. 15. At the time of the gate cutting, a second R surface (or a second C surface) 24*d* can be molded at an edge portion on the side opposite to the signal transfer surface 13 side of the center hole 24 of the disk substrate 23 by the second R surface molding portion (or the second C surface molding portion) 20.

(6) Description of Third Embodiment of the Mold Apparatus for Injection Molding the Disk Substrate Next, referring to FIGS. 16 and 17, Third Embodiment of the mold apparatus 1 will be described. In this case, the cutting position is provided at two inner and outer positions, namely, a first cutting position C1 for cutting by an outer circumferential surface 7*c* of an outer circumferential portion 7*a* of the gate forming recessed portion 12 of the gate cutter 7 and the straight molding portion 16 which is the outer circumferential surface of the gate forming projected portion 11 of the sprue bushing 6, and a second cutting position C2 for cutting by an inner circumferential surface 7*b* of the outer circumferential portion 7*a* of the gate forming recessed portion 12 and an inner circumferential surface 1*ib* of a cutout portion 11*a* formed annularly at an outer circumferential portion of the tip of the gate forming projected portion 11. The inside diameter $\phi 1$ at the first cutting position C1 is equal to the inside diameter $\phi 1$ of the straight portion 24*a* of the center hole 24 of the disk substrate 23, and the inside diameter $\phi 3$ at the second cutting position C2 is smaller than the first inside diameter $\phi 1 (\phi 1 > \phi 3)$, with concentric relationship therebetween.

In this case, as shown in FIG. 16, a molten resin P1 is injected into the cavity 4 through the gate 14, thereby injection molding the disk substrate 23. At a time point when the molten resin P1 is solidified to a certain extent (a time point when the disk substrate 23 can be compressed), the gate cutter 7 is advanced in the direction of arrow b to perform gate cutting. At the time of the gate cutting, the first cutting position C1 of the disk substrate 23 is cut between the outer circumferential surface 7c of the tip portion 7a of the gate cutter 7 and the straight molding portion 16 of the center hole molding portion, and the second cutting position C2 of the disk substrate 23 is cut between the inner circumferential surface 7b of the tip portion 7a of the gate cutter 7 and the inner circumferential surface 11b of the cutout portion 11a of the gate forming portion 11. Thus, the gate cutting is conducted simultaneously at the two inner and outer cutting positions.

In this case, as shown in FIG. 17, the maximum outside diameter $\phi 3$ of the sprue and gate remaining resin 23 gate-cut from the disk substrate 23 is smaller than the minimum inside diameter $\phi 1$ of the center hole 24 of the disk substrate 23. Therefore, the step of blowing off the sprue and gate remaining resin 23a from the inside of the center hole 24 of the disk substrate 23 in the direction of arrow b by the air jet nozzle 34 after chucking the molded disk substrate 23 by the suction pad 33 of the robot 31, as described above referring to FIG. 11, can be performed more smoothly. Besides, in this case, the sprue and gate remaining resin 23a can also be blown off in the direction of arrow b indicated by the broken line in FIG. 11, which is the opposite direction, from the inside of the center hole 24 of the disk substrate 23 in the manner of passing through the center hole 24.

(7) Description of Fourth Embodiment of the Mold Apparatus for Injection Molding the Disk Substrate Next, referring to FIGS. 18 and 19, Fourth Embodiment of the molding apparatus 1 will be described. In this case, the diameter of the outer circumferential surface 7c of the tip portion 7a of the gate cutter 7 in Third Embodiment shown in FIGS. 16 and 17 is set to be sufficiently larger than the diameter of the straight molding portion 16 of the center hole molding portion 15, whereby a sufficiently large step H is formed between the outer circumferential surface 7c and the straight molding portion 16.

Therefore, in this case, as shown in FIG. 18, the opening factor of a connecting portion 14a between the outer circumferential portion of the gate 14 and the cavity 4 can be set to be large, so that the molten resin P1 can flow smoothly from the inside of the 14 into the cavity 4, and moldability of the disk substrate 23 can be enhanced.

(8) Description of Fifth Embodiment of the Mold Apparatus for Injection Molding the Disk Substrate Next, referring to FIGS. 20 and 21, Fifth Embodiment of the molding apparatus 1 will be described. In this case, a second R surface molding portion (or second C surface molding portion) 20 is provided at a corner portion on the outer circumference side of a tip surface of the tip portion 7a of the gate forming recessed portion 12 of the gate cutter 7 in Fourth Embodiment shown in FIGS. 18 and 19.

As shown in FIG. 20, a molten resin P1 is injected into the cavity 4 through the gate 14, thereby molding the disk substrate 23. At a time point when the molten resin P1 is solidified to a certain extent (a time point when the disk substrate 23 can be compressed), the gate cutter 7 is advanced in the direction of arrow b to perform gate cutting, as shown in FIG. 21. At the time of the gate cutting, a second R surface (or second C surface) 24d can be molded at an edge portion on the side opposite to the signal transfer surface 13 side of the center hole 24 of the disk substrate 23 by the second R surface molding portion (or second C surface molding portion) 20.

While the embodiments of the present invention have been described above, the present invention is not limited to the above embodiments, and various modifications are possible based on the technical thought of the present invention.

The disk substrate, the mold apparatus for injection molding the same, and the disk substrate taking-out robot according to the present invention, constituted as described above, have the following effects.

The disk substrate according to the present invention has a structure in which at least the edge on the signal transfer side of the center hole is utterly free of flash, or even if a flash is generated there, the height of the flash can be suppressed to equal to or less than 10 μm. Therefore, centering of the disk substrate by a positioning center pin of a spindle motor can be performed with high accuracy, and eccentricity amount of the disk substrate at the time of driving for rotation can be suppressed. Accordingly, stable recording and reproduction can be achieved in a disk for high-density recording. In addition, since the center hole is free of flash, less waste are generated at the time of production, and disks with little air can be shipped, leading to a higher yield.

Besides, since the first R surface or first C surface is formed at least at the edge on the signal transfer surface side of the center hole, the edge is completely free of flash.

Since the straight portion with a hole diameter parallel to the axial direction is provided on the side opposite to the signal transfer surface side of the center hole and the tapered portion with a hole diameter gradually enlarged toward the signal transfer surface is provided between the straight portion of the center hole and the signal transfer surface, flash would not easily be generated at the edge on the signal transfer surface side of the center hole, and even if a flash is generated at the edge, the bad effect of the flash on the centering of the disk substrate can be minimized.

The injection molding apparatus according to the present invention includes a stamper disposed on a fixed die side of a cavity, a gate forming projected portion provided at the outer circumference of the tip of a sprue bushing, a gate forming recessed portion provided at the tip of a gate cutter disposed on a movable die side, and a center hole molding portion provided at the gate forming projected portion, and adopts a gate cutting structure relative to a signal transfer surface of a disk substrate injection molded in the cavity. Therefore, when the disk substrate is injection molded, a center hole is simultaneously injection molded by the center hole molding portion. Thus, when the gate cutter whose tip is recessed in shape is advanced from the movable die side to perform gate cutting, a center hole free of flash at both end edges can be produced. Accordingly, by adopting the fixed-side stamper in the same manner as in the prior art, the disk substrate free of flash at the center hole can be injection molded while preventing deformation of pits and a groove. Since the center hole molding portion is disposed on the fixed stamper side, the eccentricity amount of the groove relative to the center hole can be suppressed to be small, and reading of a tracking servo signal and the like can be performed with high accuracy.

The center hole molding portion is provided with the first R surface molding portion or first C surface molding portion for molding the first R surface or first C surface at the edge on the signal transfer surface side of the center hole. Therefore, when the disk substrate is injection molded, the first R surface or first C surface is simultaneously injection molded at the edge on the signal transfer surface side of the center hole, whereby generation of flash at the edge can be obviated.

A center hole molding projected portion is provided with a straight molding portion for molding a straight portion on the side opposite to the signal transfer surface of the center hole, and a center hole molding portion is provided with a taper molding portion for molding a tapered portion with a hole diameter gradually enlarged from the straight portion of the center hole toward the signal transfer surface side. Therefore, when the disk substrate is injection molded, the center hole can simultaneously be injection molded with the straight portion and the tapered portion, and the disk substrate will easily be released from the stamper when the movable die is opened.

In addition, the advance amount of the gate cutter is set to equal to or more than the gate thickness, and, desirably, set to be equal to or less than the gate thickness plus 0.5 mm, whereby gate cutting can be securely performed.

Besides, the position of cutting the gate by the gate cutter is set at a hole diameter position of the straight portion of the center hole, so that flash or the like is not generated in the straight portion.

The second R surface molding portion or second C surface molding portion for molding the second R surface or second C surface at the edge on the side opposite to the signal transfer surface side of the center hole is provided at the tip of an outer circumferential portion of the gate forming recessed portion of the gate cutter. Therefore, the edge on the side opposite to the signal transfer surface side of the center hole of the disk substrate can be molded with the second R surface or second C surface.

Besides, the position of cutting the gate by the recessed form gate cutter is set at two inner and outer positions, namely, a first cutting position set at a hole diameter position of the straight portion of the center hole, and at a second cutting position located on the inside of the first cutting position and smaller in diameter than the first cutting position. Therefore, the maximum outside diameter of a sprue and gate remaining resin after gate cutting of the molded disk substrate can be made sufficiently smaller than the inside diameter of the straight portion of the center hole; accordingly, at the time of chucking the disk substrate by a robot and transferring the disk substrate onto an aligning machine, the sprue and gate remaining resin can easily be discharged to any of one side and the other side of the disk substrate by passing it through the center hole of the disk substrate.

The disk substrate taking-out apparatus according to the present invention is so constructed that gate cutting is conducted from a movable die side by a gate cutter, and a robot for taking out from the movable die the disk substrate released from the fixed die together with the movable die by the opening of the movable die after injection molding is provided with a means for discharging a sprue and gate remaining resin to the movable die side relative to the disk substrate. Therefore, even though the sprue and gate remaining resin is projected to the side of a surface opposite to the signal transfer surface of the disk substrate which is reverse to that in the prior art, the sprue and gate remaining resin can be easily discharged from the inside of the center hole. Accordingly, a disk substrate taking-out apparatus optimum for application to the mold apparatus of the gate cutting structure can be provided.

In addition, where the means for discharging the sprue and gate remaining resin is provided with an air jet nozzle, the operation of discharging the sprue and gate remaining resin to the movable die side after taking out the sprue and gate remaining resin from the mold can be performed securely and instantaneously.

The invention claimed is:

1. A mold apparatus for injection molding a disk substrate, comprising a cavity into which a molten resin is injected through a sprue bushing and a gate, and a signal transfer stamper disposed on a fixed die side of said cavity, said mold apparatus comprising:
   the sprue bushing disposed on the fixed side;
   a gate cutter disposed on a movable die side wherein a projected portion at a tip of the spruce bushing, and a center hole molding portion is provided at an outer circumference of said sprue bushing and a recessed portion is formed at a tip of the gate cutter opposite to the projection portion of the sprue bushing and the gate cutter whose tip is recessed in shape is advanced from the movable die side to perform gate cutting.

2. A mold apparatus for injection molding a disk substrate as set forth in claim 1, wherein said center hole molding portion comprises a straight molding portion for molding a straight portion with a hole diameter equal in direction with the axial direction on the side opposite to a signal transfer surface side of said center hole of said disk substrate injection molded in said cavity, and a taper molding portion for molding a tapered portion with a hole diameter gradually enlarged toward the signal transfer surface side between said straight portion of said center hole of said disk substrate injection molded in said cavity and a signal transfer surface.

3. A mold apparatus for injection molding a disk substrate as set forth in claim 1, wherein the advance amount of said gate cutter is not less than the thickness of said gate and is not more than the gate thickness plus 0.5 mm.

4. A mold apparatus for injection molding a disk substrate as set forth in claim 2, wherein the position of cutting said gate by said gate cutter is set at a position equal to the hole diameter of said straight portion of said center hole.

* * * * *